United States Patent
Park et al.

(10) Patent No.: US 10,256,880 B2
(45) Date of Patent: Apr. 9, 2019

(54) CODEBOOK CONFIGURATION METHOD IN MULTI-ANTENNA WIRELESS COMMUNICATION SYSTEM AND DEVICE FOR SAME

(71) Applicant: LG ELECTRONICS INC., Seoul (KR)

(72) Inventors: Haewook Park, Seoul (KR); Kijun Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/741,143

(22) PCT Filed: Jul. 1, 2016

(86) PCT No.: PCT/KR2016/007114
§ 371 (c)(1),
(2) Date: Dec. 29, 2017

(87) PCT Pub. No.: WO2017/003252
PCT Pub. Date: Jan. 5, 2017

(65) Prior Publication Data
US 2018/0198501 A1 Jul. 12, 2018

Related U.S. Application Data

(60) Provisional application No. 62/187,264, filed on Jul. 1, 2015.

(51) Int. Cl.
*H04B 7/04* (2017.01)
*H04B 7/0456* (2017.01)
(Continued)

(52) U.S. Cl.
CPC ........ *H04B 7/0486* (2013.01); *H04B 7/0417* (2013.01); *H04B 7/0469* (2013.01);
(Continued)

(58) Field of Classification Search
CPC .. H04B 7/0486; H04B 7/0417; H04B 7/0469; H04B 7/0626; H04B 7/0628; H04B 7/0639
See application file for complete search history.

(56) References Cited

U.S. PATENT DOCUMENTS 7,895,044 B2    2/2011   Lin et al.
2013/0265899 A1* 10/2013 Sayana ............... H04W 24/00
                                                          370/252
(Continued)

FOREIGN PATENT DOCUMENTS

KR    10-2013-0009314 A    1/2013
KR    10-2015-0058471 A    5/2015
WO    2014/119276 A1       8/2014

*Primary Examiner* — Jaison Joseph
(74) *Attorney, Agent, or Firm* — Birch, Stewart, Kolasch & Birch, LLP

(57) ABSTRACT

A method for configuring a codebook in a multi-antenna wireless communication system and a device for supporting the same are disclosed. Particularly, a method for configuring a codebook performed by a user equipment (UE) in a wireless communication system may include receiving a parameter for configuring a codebook C from a base station (BS) and configuring the codebook C using the parameter for configuring a codebook C, and the codebook C may be configured by Kronecker product of a vertical codebook $W_V$ for a vertical antenna element and a horizontal codebook $W_H$ for a horizontal antenna element, the parameter for configuring a codebook C may include one or more of an upper limit value and a lower limit value in one-dimension of a beam, and an angle in the one dimension of a beam
(Continued)

generated from the codebook C may be determined within the upper limit value and the lower limit value.

11 Claims, 18 Drawing Sheets

(51) Int. Cl.
  *H04B 7/0417* (2017.01)
  *H04B 7/06* (2006.01)
(52) U.S. Cl.
  CPC ......... *H04B 7/0478* (2013.01); *H04B 7/0626* (2013.01); *H04B 7/0628* (2013.01); *H04B 7/0639* (2013.01)

(56) References Cited

U.S. PATENT DOCUMENTS

| | | | | |
|---|---|---|---|---|
| 2015/0146650 | A1* | 5/2015 | Ko | H04B 7/0456 370/329 |
| 2015/0372729 | A1* | 12/2015 | Tajima | H04B 7/0456 375/267 |
| 2017/0033856 | A1* | 2/2017 | Su | H04B 7/04 |
| 2018/0123659 | A1* | 5/2018 | Qian | H04B 7/0456 |

\* cited by examiner

【FIG. 1】
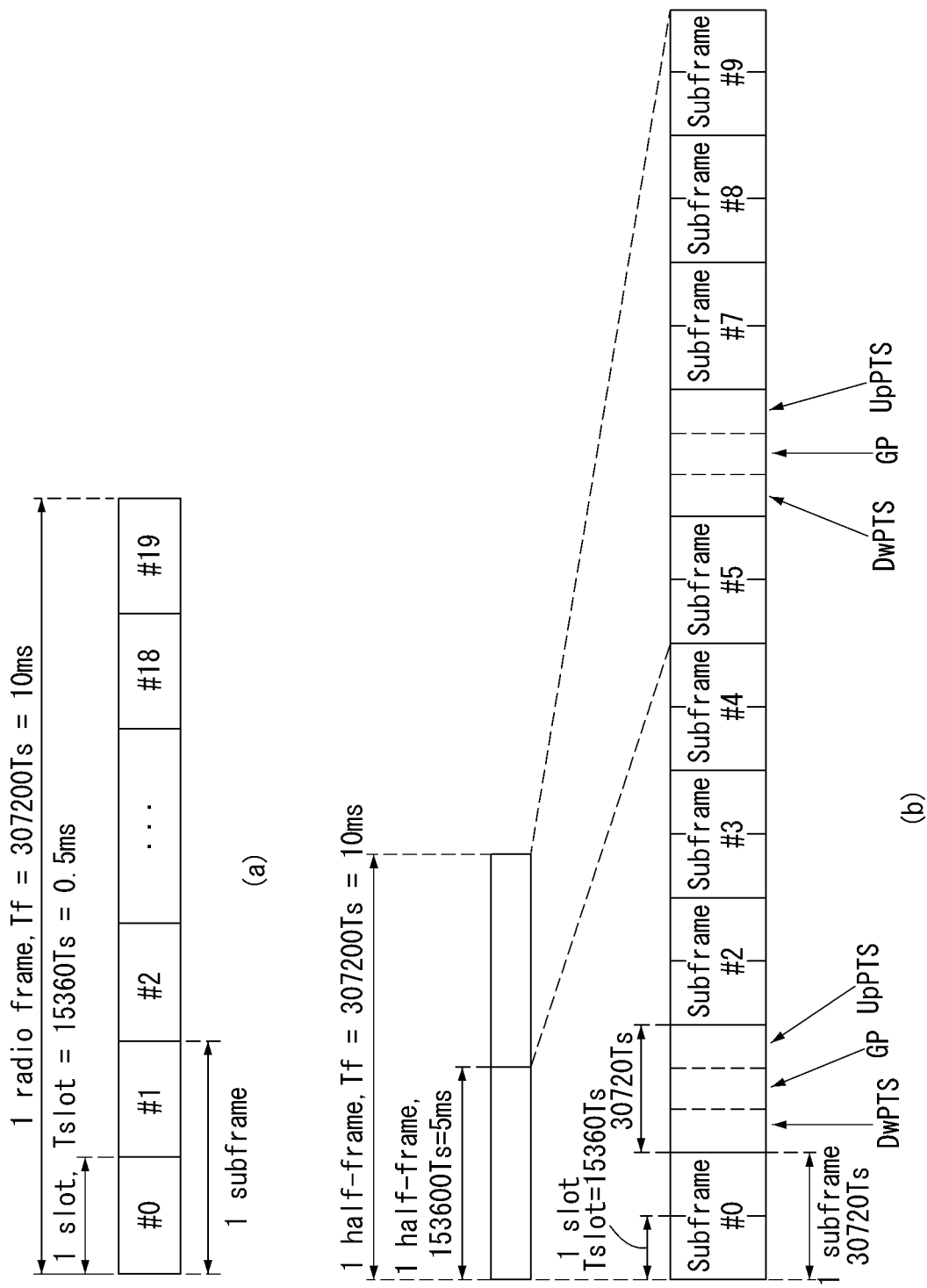

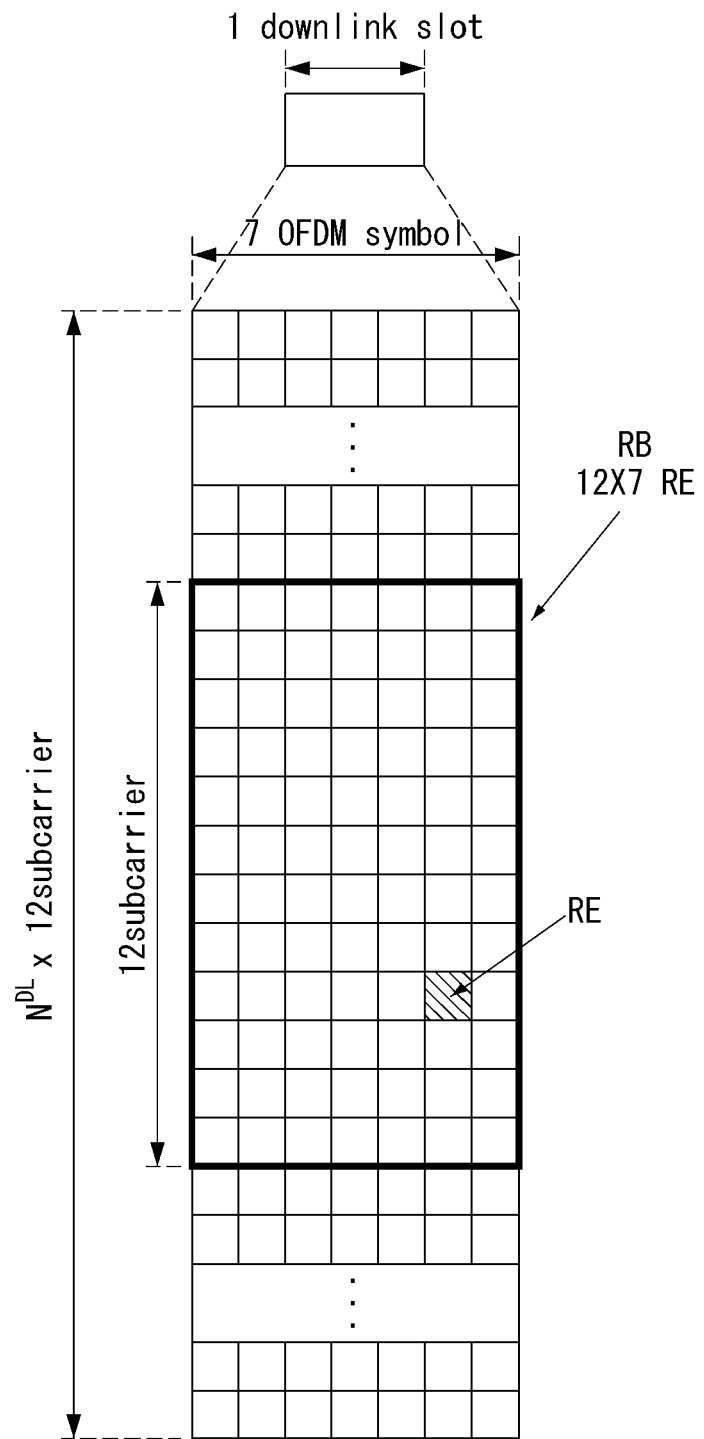
[FIG. 2]

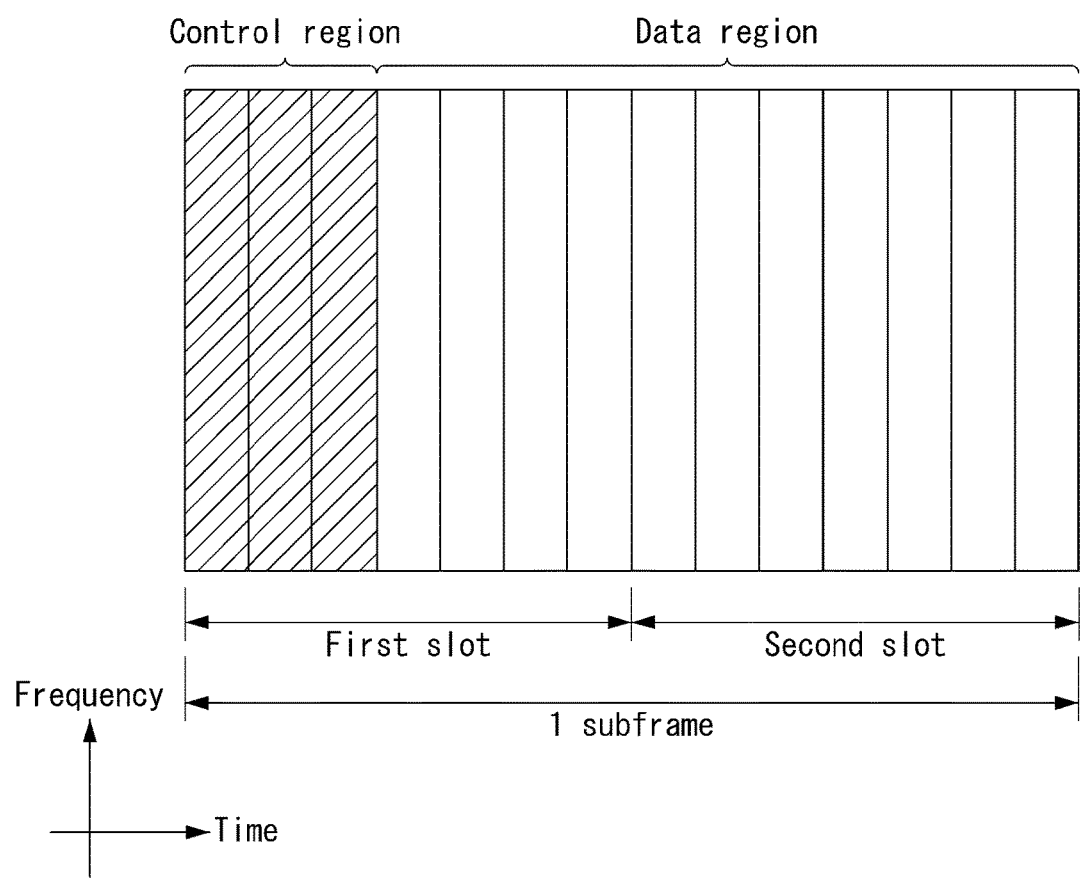

[FIG. 4]
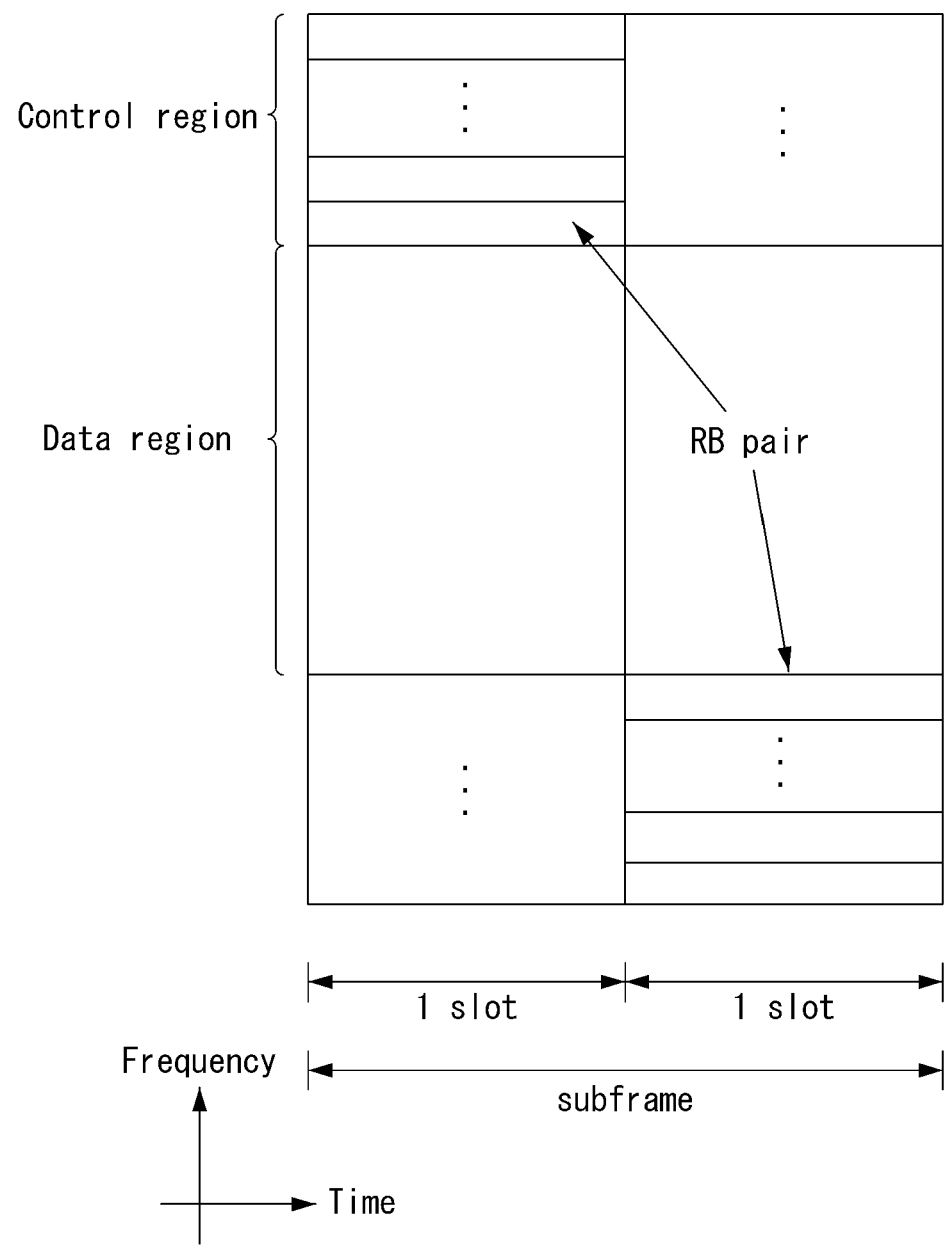

[FIG. 5]
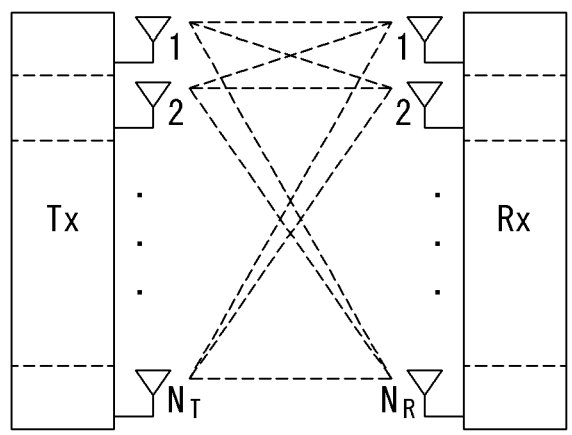
[FIG. 6]
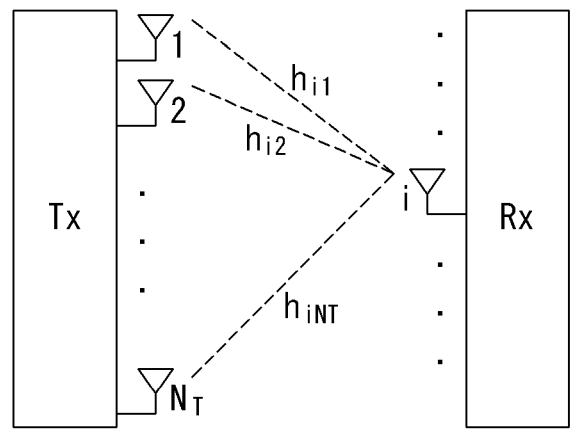

[FIG. 7]
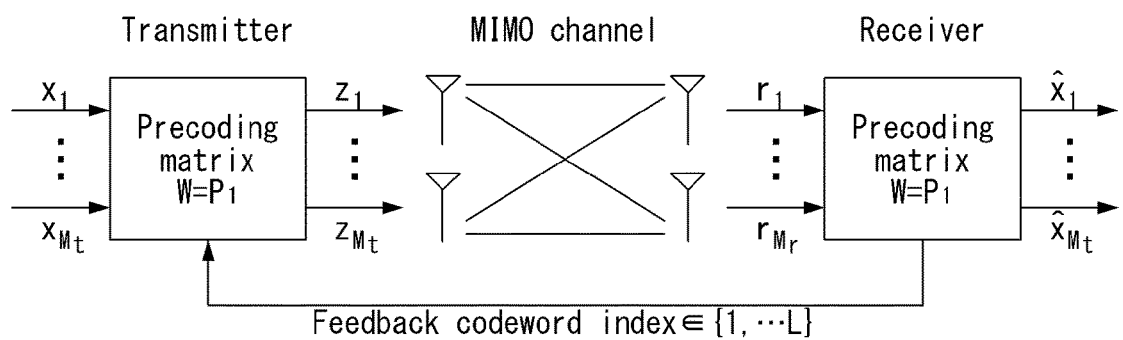

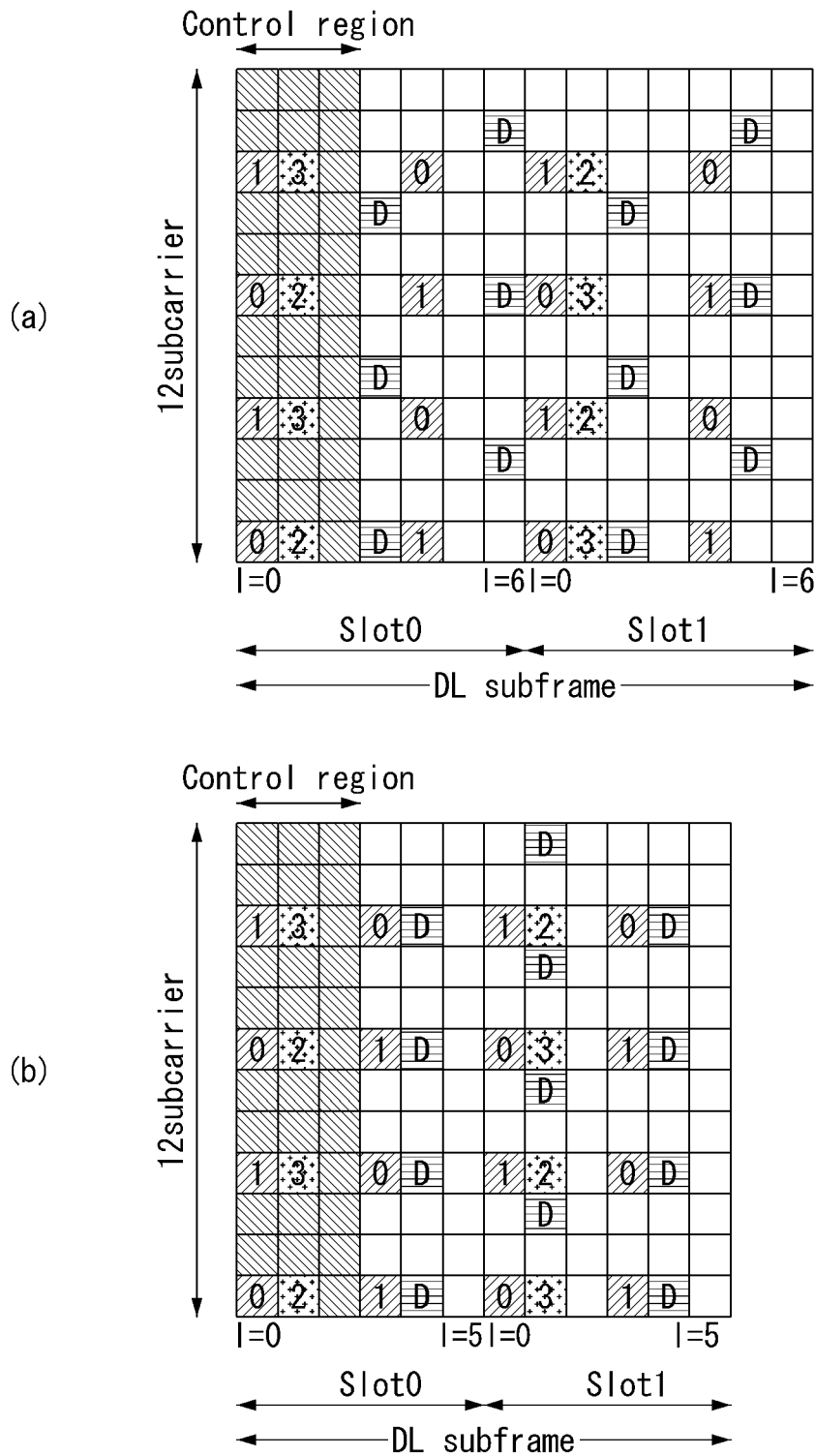
[FIG. 8]

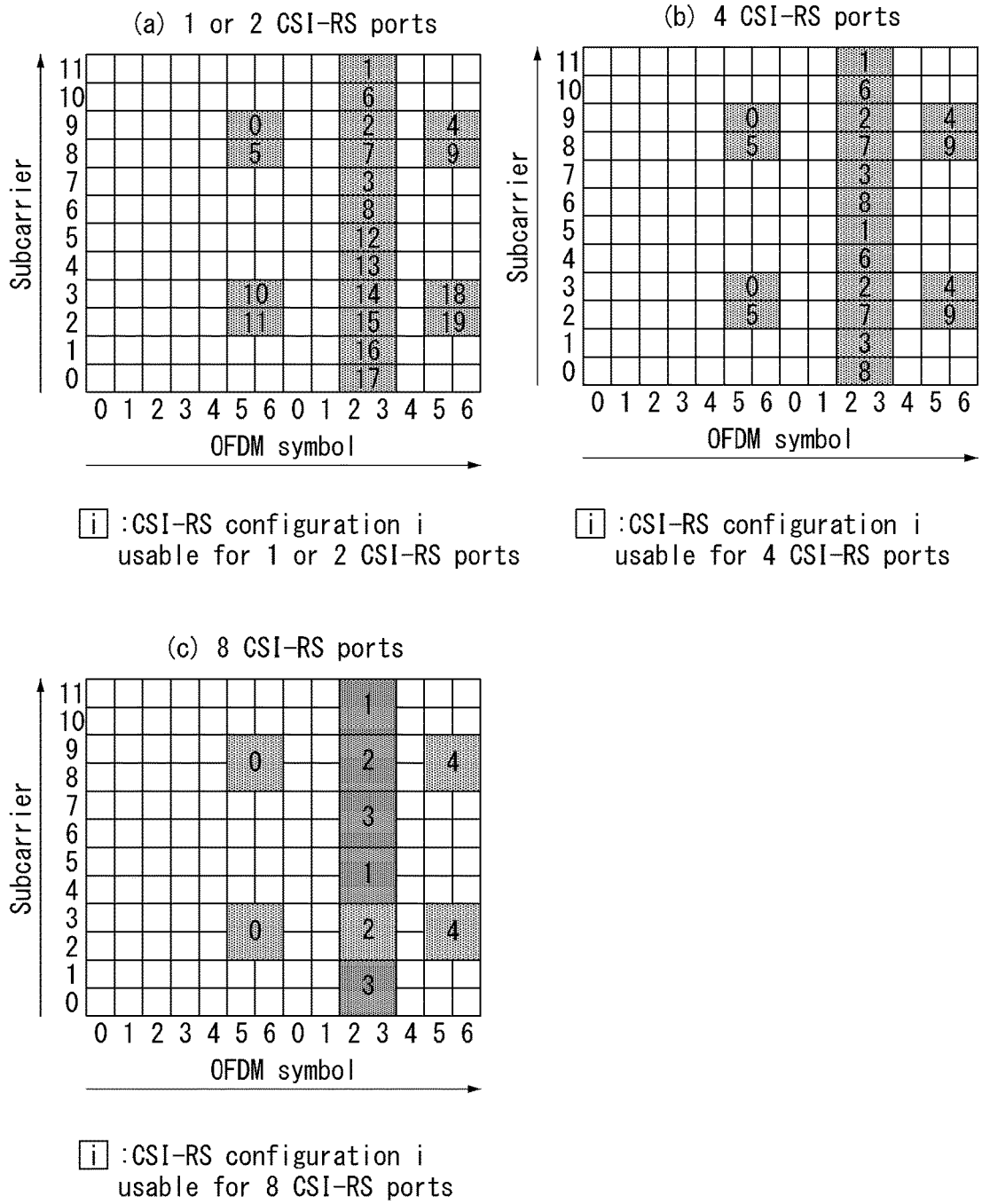
[FIG. 9]

【FIG. 10】
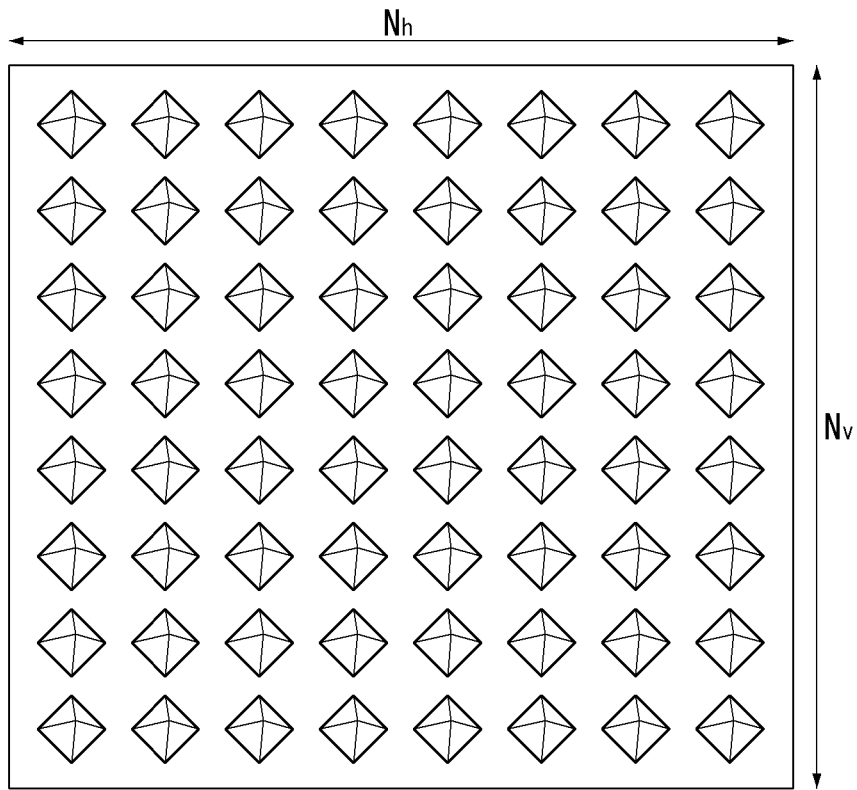
【FIG. 11】
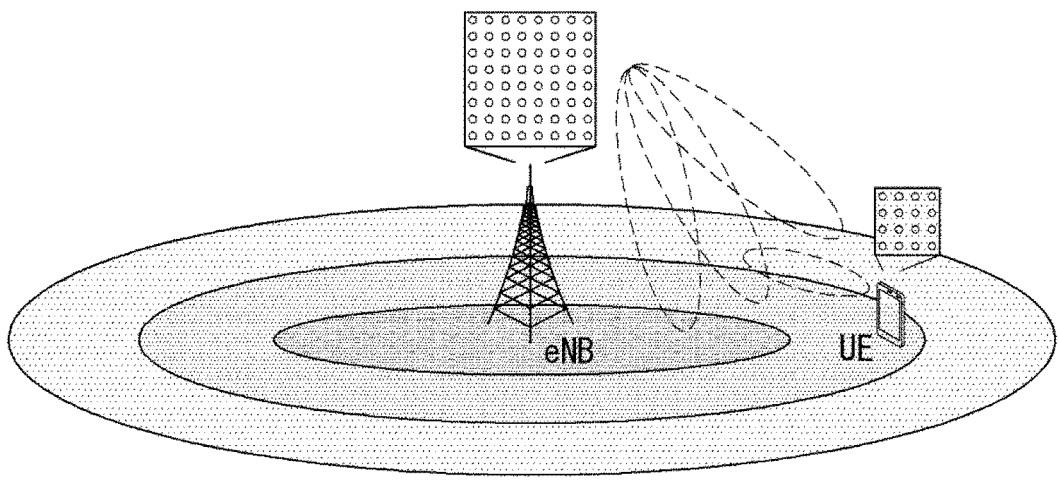

[FIG. 12]
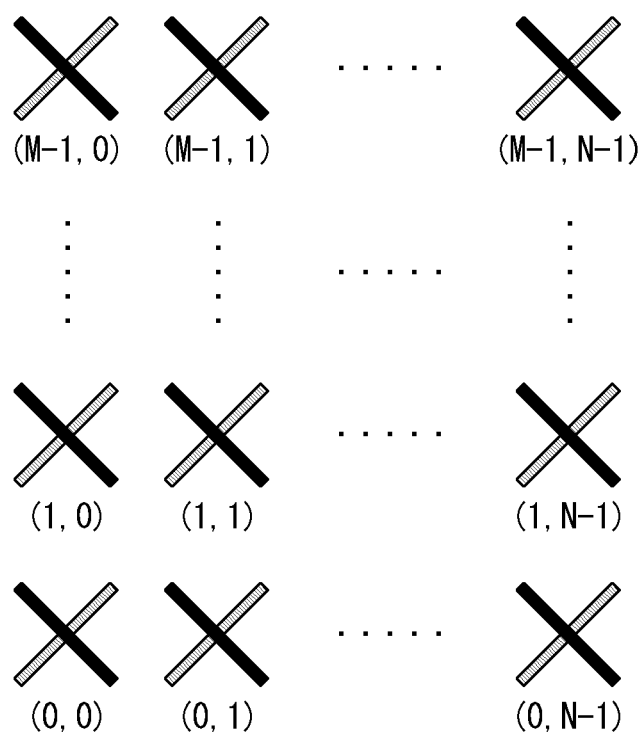

[FIG. 13]
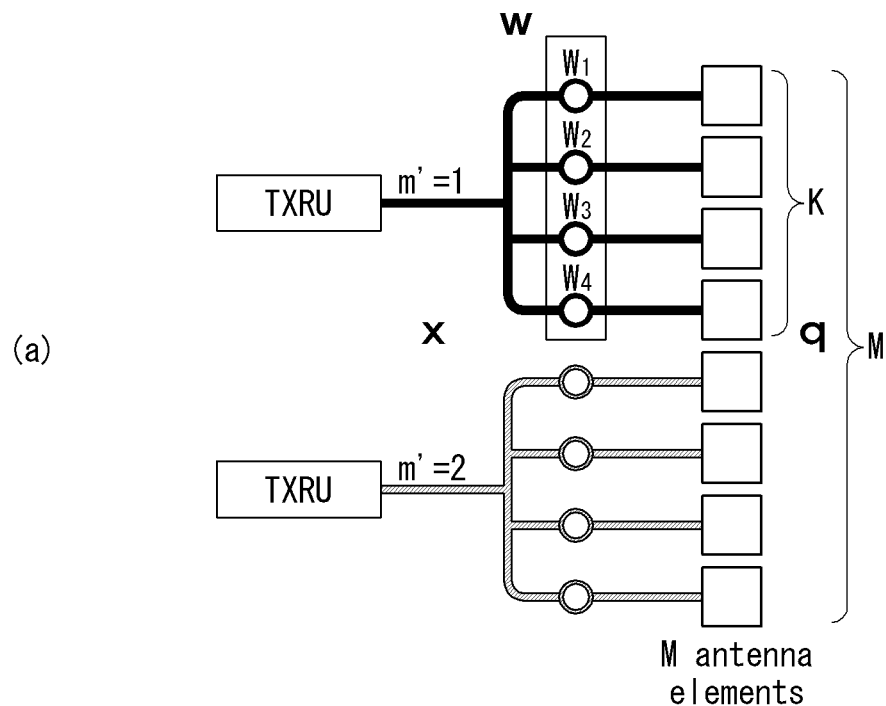
(a)
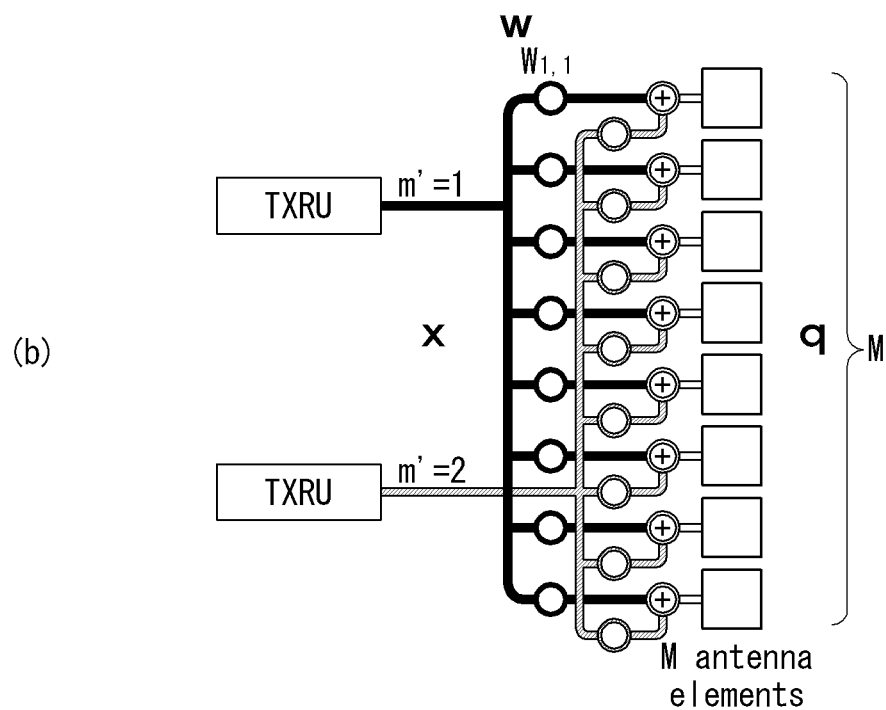
(b)

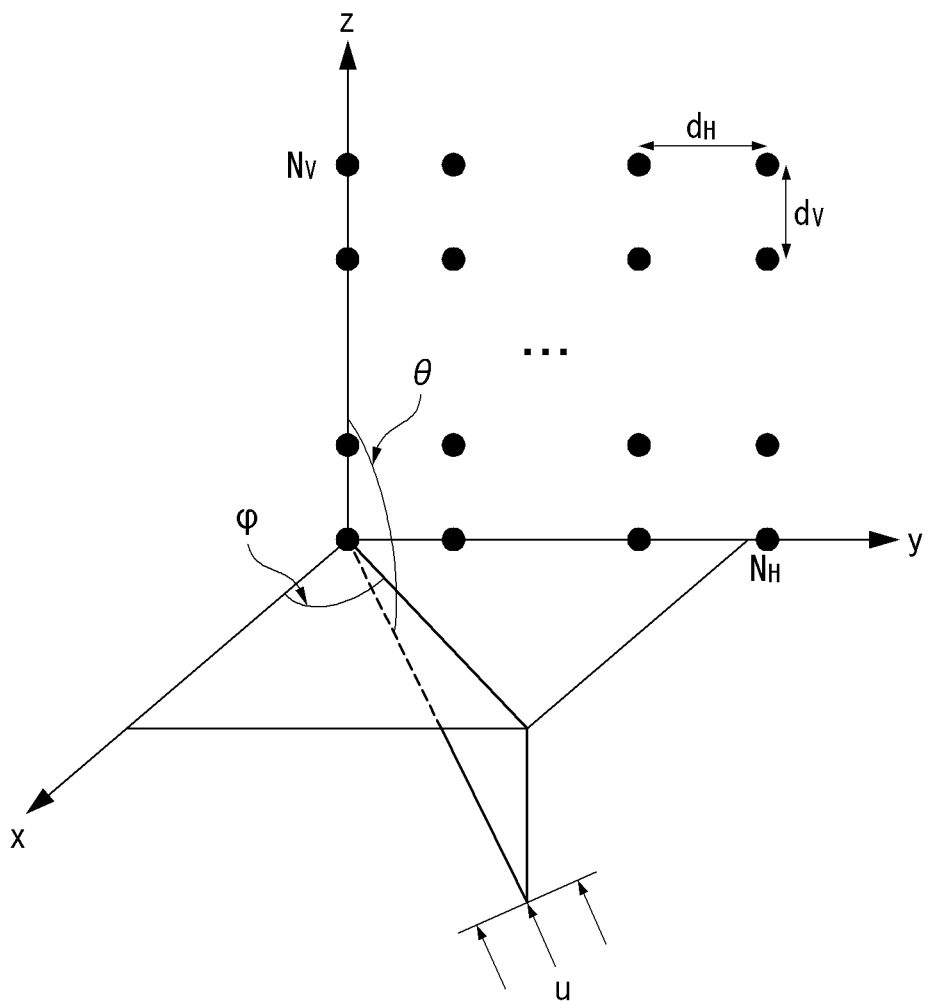

[FIG. 15]

$$W_V = \begin{bmatrix} 1 & \exp(j \cdot 2\pi \cdot \frac{d_V}{\lambda} \cdot \cos(\theta_{etilt,1})) & \cdots & \exp(j \cdot 2\pi \cdot \frac{d_V}{\lambda} \cdot \cos(\theta_{etilt,2})) & \cdots & \exp(j \cdot 2\pi \cdot \frac{d_V}{\lambda} \cdot \cos(\theta_{etilt,Q_V})) \\ \vdots & \vdots & \ddots & \vdots & & \vdots \\ \exp(j \cdot 2\pi \cdot (N_V - 1) \cdot \frac{d_V}{\lambda} \cdot \cos(\theta_{etilt,1})) & \exp(j \cdot 2\pi \cdot (N_V - 1) \cdot \frac{d_V}{\lambda} \cdot \cos(\theta_{etilt,2})) & \cdots & \exp(j \cdot 2\pi \cdot (N_V - 1) \cdot \frac{d_V}{\lambda} \cdot \cos(\theta_{etilt,Q_V})) \end{bmatrix}$$

[FIG. 16]

$$W_{H,1} = \begin{bmatrix} 1 & 1 & \cdots & 1 \\ \exp(j \cdot 2\pi \cdot \frac{d_H}{\lambda} \cdot \sin(\theta_{etilt,1}) \cdot \sin(\varphi_{escan,1})) & \exp(j \cdot 2\pi \cdot \frac{d_H}{\lambda} \cdot \sin(\theta_{etilt,1}) \cdot \sin(\varphi_{escan,2})) & \cdots & \exp(j \cdot 2\pi \cdot \frac{d_H}{\lambda} \cdot \sin(\theta_{etilt,1}) \cdot \sin(\varphi_{escan,Q_H})) \\ \vdots & \vdots & \ddots & \vdots \\ \exp(j \cdot 2\pi \cdot (N_H-1) \cdot \frac{d_H}{\lambda} \cdot \sin(\theta_{etilt,1}) \cdot \sin(\varphi_{escan,1})) & \exp(j \cdot 2\pi \cdot (N_H-1) \cdot \frac{d_H}{\lambda} \cdot \sin(\theta_{etilt,1}) \cdot \sin(\varphi_{escan,2})) & \cdots & \exp(j \cdot 2\pi \cdot (N_H-1) \cdot \frac{d_H}{\lambda} \cdot \sin(\theta_{etilt,1}) \cdot \sin(\varphi_{escan,Q_H})) \end{bmatrix}$$

$$W_{H,2} = \begin{bmatrix} 1 & 1 & \cdots & 1 \\ \exp(j \cdot 2\pi \cdot \frac{d_H}{\lambda} \cdot \sin(\theta_{etilt,2}) \cdot \sin(\varphi_{escan,1})) & \exp(j \cdot 2\pi \cdot \frac{d_H}{\lambda} \cdot \sin(\theta_{etilt,2}) \cdot \sin(\varphi_{escan,2})) & \cdots & \exp(j \cdot 2\pi \cdot \frac{d_H}{\lambda} \cdot \sin(\theta_{etilt,2}) \cdot \sin(\varphi_{escan,Q_H})) \\ \vdots & \vdots & \ddots & \vdots \\ \exp(j \cdot 2\pi \cdot (N_H-1) \cdot \frac{d_H}{\lambda} \cdot \sin(\theta_{etilt,2}) \cdot \sin(\varphi_{escan,1})) & \exp(j \cdot 2\pi \cdot (N_H-1) \cdot \frac{d_H}{\lambda} \cdot \sin(\theta_{etilt,2}) \cdot \sin(\varphi_{escan,2})) & \cdots & \exp(j \cdot 2\pi \cdot (N_H-1) \cdot \frac{d_H}{\lambda} \cdot \sin(\theta_{etilt,2}) \cdot \sin(\varphi_{escan,Q_H})) \end{bmatrix}$$

$$W_{H,Q_V} = \begin{bmatrix} 1 & 1 & \cdots & 1 \\ \exp(j \cdot 2\pi \cdot \frac{d_H}{\lambda} \cdot \sin(\theta_{etilt,Q_V}) \cdot \sin(\varphi_{escan,1})) & \exp(j \cdot 2\pi \cdot \frac{d_H}{\lambda} \cdot \sin(\theta_{etilt,Q_V}) \cdot \sin(\varphi_{escan,2})) & \cdots & \exp(j \cdot 2\pi \cdot \frac{d_H}{\lambda} \cdot \sin(\theta_{etilt,Q_V}) \cdot \sin(\varphi_{escan,Q_H})) \\ \vdots & \vdots & \ddots & \vdots \\ \exp(j \cdot 2\pi \cdot (N_H-1) \cdot \frac{d_H}{\lambda} \cdot \sin(\theta_{etilt,Q_V}) \cdot \sin(\varphi_{escan,1})) & \exp(j \cdot 2\pi \cdot (N_H-1) \cdot \frac{d_H}{\lambda} \cdot \sin(\theta_{etilt,Q_V}) \cdot \sin(\varphi_{escan,2})) & \cdots & \exp(j \cdot 2\pi \cdot (N_H-1) \cdot \frac{d_H}{\lambda} \cdot \sin(\theta_{etilt,Q_V}) \cdot \sin(\varphi_{escan,Q_H})) \end{bmatrix}$$

[FIG. 17]
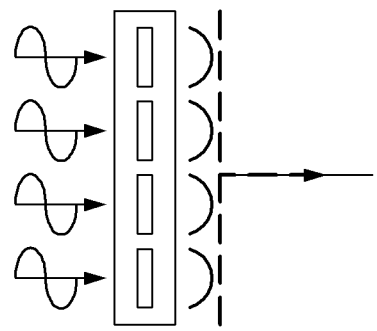
(a) Without tilt
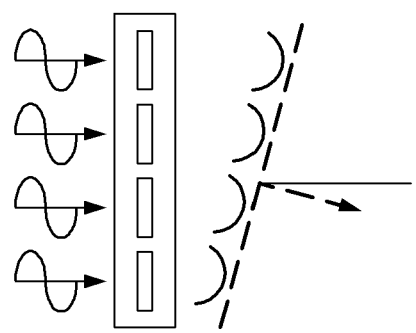
(b) Electrical tilt
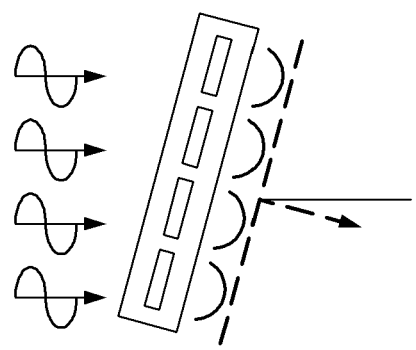
(c) Mechanical tilt

[FIG. 18]
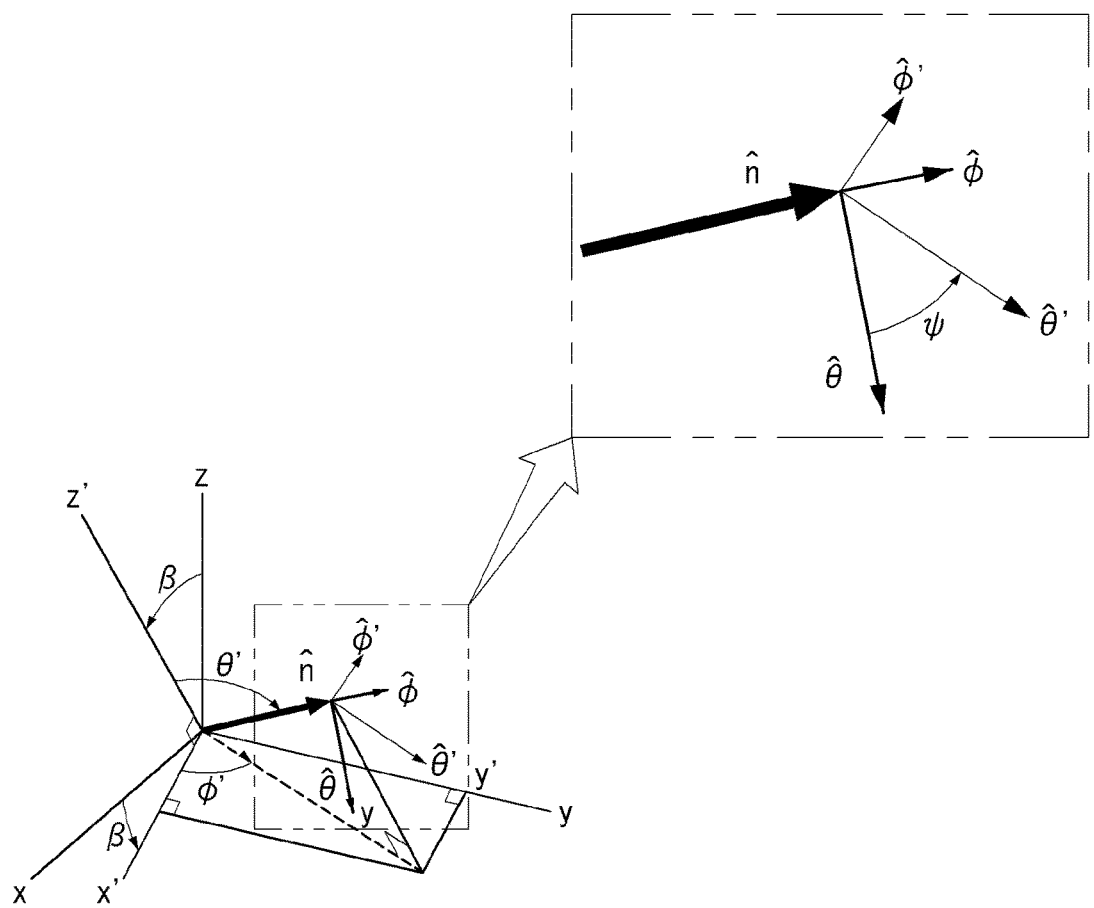

[FIG. 19]
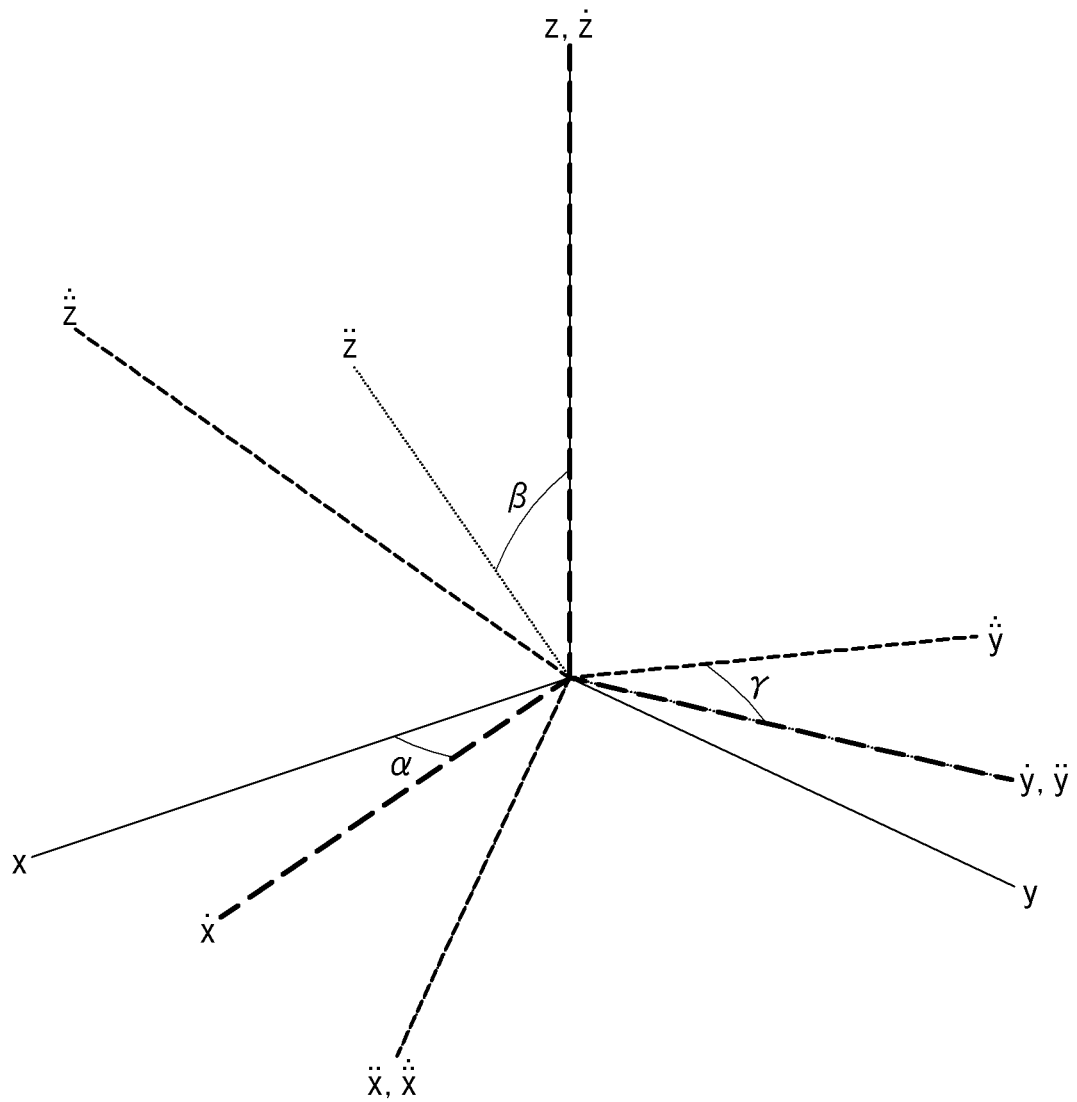

[FIG. 20]
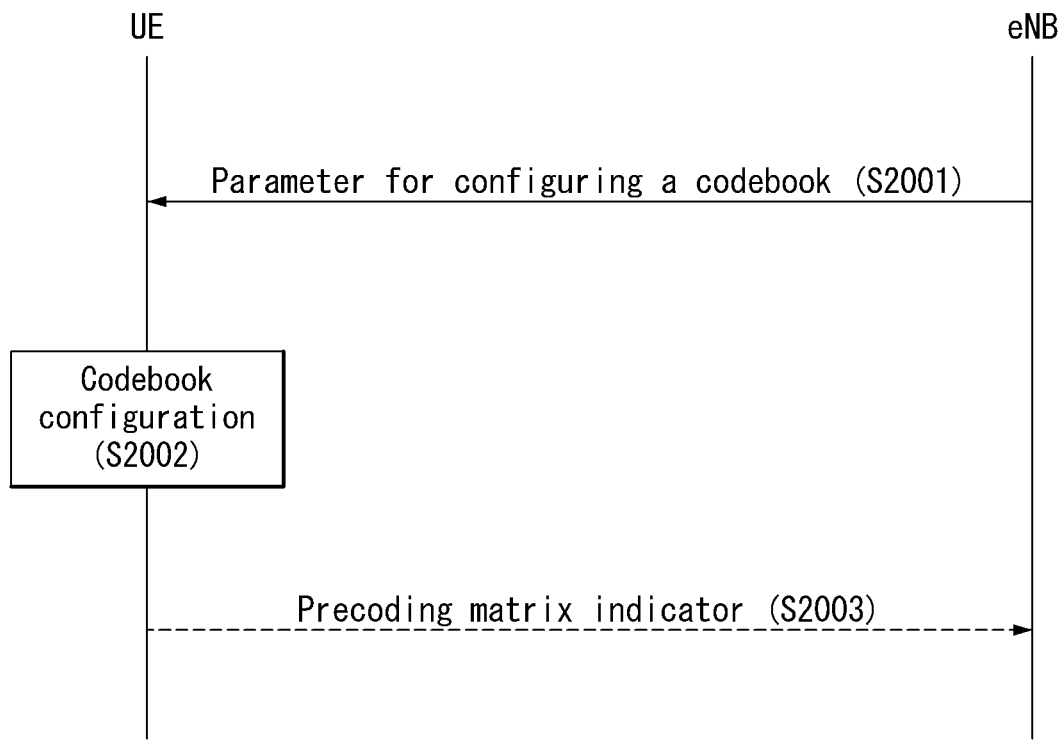
[FIG. 21]
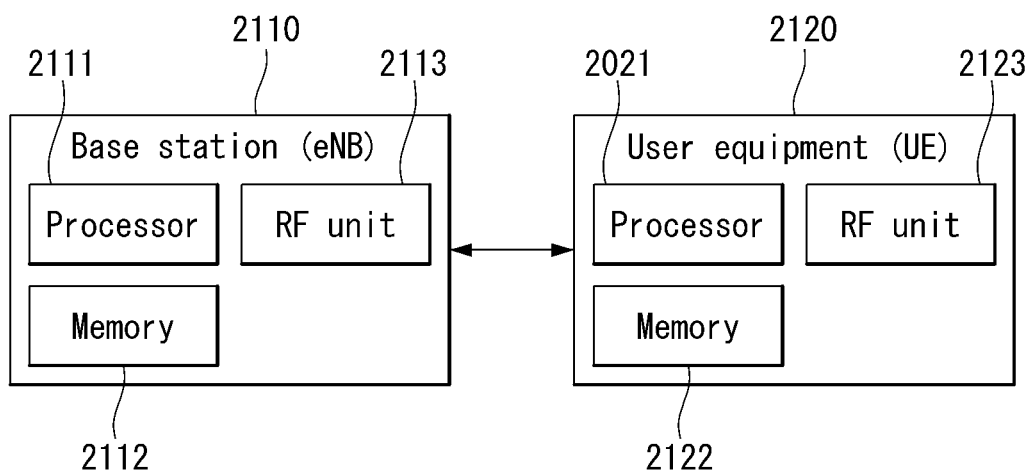

CODEBOOK CONFIGURATION METHOD IN MULTI-ANTENNA WIRELESS COMMUNICATION SYSTEM AND DEVICE FOR SAME

CROSS REFERENCE TO RELATED APPLICATIONS

This application is the National Phase of PCT International Application No. PCT/KR2016/007114, filed on Jul. 1, 2016, which claims priority under 35 U.S.C. 119(e) to U.S. Provisional Application No. 62/187,264, filed on Jul. 1, 2015, all of which are hereby expressly incorporated by reference into the present application.

TECHNICAL FIELD

The present invention relates to wireless communications, and more particularly, to a method for configuring (constructing) a codebook in a wireless communication system that supports 3-dimensional Multi-Input Multi-Output (MIMO) system and a device for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to propose a method for configuring (constructing) a codebook using a tilting angle in a wireless communication system that supports 3-dimensional MIMO system.

In addition, an object of the present invention is to propose a method for configuring (constructing) a codebook by considering a position of a receiving-end in a wireless communication system that supports 3-dimensional MIMO system.

Technological objects to be achieved by the present invention are not limited to the aforementioned objects, and other objects that have not been described may be clearly understood by a person having ordinary skill in the art to which the present invention pertains from the following description.

Technical Solution

According to an aspect of the present invention, a method for configuring a codebook performed by a user equipment (UE) in a wireless communication system may include receiving a parameter for configuring a codebook C from a base station (BS) and configuring the codebook C using the parameter for configuring a codebook C, and the codebook C may be configured by Kronecker product of a vertical codebook $W_V$ for a vertical antenna element and a horizontal codebook $W_H$ for a horizontal antenna element, the parameter for configuring a codebook C may include one or more of an upper limit value and a lower limit value in one-dimension of a beam, and an angle in the one dimension of a beam generated from the codebook C may be determined within the upper limit value and the lower limit value.

According to another aspect of the present invention, a user equipment (UE) configuring a codebook in a wireless communication system may include a radio frequency (RF) unit for transmitting and receiving a radio signal and a processor for controlling the RF unit, and the processor is configured to perform: receiving a parameter for configuring a codebook C from a base station (BS) and configuring the codebook C using the parameter for configuring a codebook C, and the codebook C may be configured by Kronecker product of a vertical codebook $W_V$ for a vertical antenna element and a horizontal codebook $W_H$ for a horizontal antenna element, the parameter for configuring a codebook C may include one or more of an upper limit value and a lower limit value in one-dimension of a beam, and an angle in the one dimension of a beam generated from the codebook C may be determined within the upper limit value and the lower limit value.

Preferably, the vertical codebook $W_V$ may be configured by Equation below.

[Equation]

$$W_V = \begin{bmatrix} 1 & 1 & \cdots & 1 \\ \exp\left(j \cdot 2\pi \cdot \frac{d_V}{\lambda} \cdot \cos(\theta_{etilt1})\right) & \exp\left(j \cdot 2\pi \cdot \frac{d_V}{\lambda} \cdot \cos(\theta_{etilt2})\right) & \cdots & \exp\left(j \cdot 2\pi \cdot \frac{d_V}{\lambda} \cdot \cos(\theta_{etiltQ_V})\right) \\ \vdots & \vdots & \ddots & \vdots \\ \exp\left(j \cdot 2\pi \cdot (N_V - 1) \cdot \frac{d_V}{\lambda} \cdot \cos(\theta_{etilt1})\right) & \exp\left(j \cdot 2\pi \cdot (N_V - 1) \cdot \frac{d_V}{\lambda} \cdot \cos(\theta_{etilt2})\right) & \cdots & \exp\left(j \cdot 2\pi \cdot (N_V - 1) \cdot \frac{d_V}{\lambda} \cdot \cos(\theta_{etiltQ_V})\right) \end{bmatrix}$$

Here, $N_V$ is a number of vertical antenna elements, $d_V$ is an interval(spacing) between vertical antenna elements, $Q_V$ is determined to be a product of the number of vertical antenna elements and an oversampling factor, and $\theta_{etilt}$ is a vertical tilting angle of a beam.

Preferably, the horizontal codebook $W_H$ may be configured by Equation below.

$$W_{H,1} = \begin{bmatrix} 1 & 1 & \cdots & 1 \\ \exp\left(j \cdot 2\pi \cdot \frac{d_H}{\lambda} \cdot \sin(\theta_{etilt1}) \cdot \sin(\varphi_{escan1})\right) & \exp\left(j \cdot 2\pi \cdot \frac{d_H}{\lambda} \cdot \sin(\theta_{etilt1}) \cdot \sin(\varphi_{escan2})\right) & \cdots & \exp\left(j \cdot 2\pi \cdot \frac{d_H}{\lambda} \cdot \sin(\theta_{etilt1}) \cdot \sin(\varphi_{escanQ_H})\right) \\ \vdots & \vdots & \ddots & \vdots \\ \exp\left(j \cdot 2\pi \cdot (N_H-1) \cdot \frac{d_H}{\lambda} \cdot \sin(\theta_{etilt1}) \cdot \sin(\varphi_{escan1})\right) & \exp\left(j \cdot 2\pi \cdot (N_H-1) \cdot \frac{d_H}{\lambda} \cdot \sin(\theta_{etilt1}) \cdot \sin(\varphi_{escan2})\right) & \cdots & \exp\left(j \cdot 2\pi \cdot (N_H-1) \cdot \frac{d_H}{\lambda} \cdot \sin(\theta_{etilt1}) \cdot \sin(\varphi_{escanQ_H})\right) \end{bmatrix}$$

$$W_{H,2} = \begin{bmatrix} 1 & 1 & \cdots & 1 \\ \exp\left(j \cdot 2\pi \cdot \frac{d_H}{\lambda} \cdot \sin(\theta_{etilt2}) \cdot \sin(\varphi_{escan1})\right) & \exp\left(j \cdot 2\pi \cdot \frac{d_H}{\lambda} \cdot \sin(\theta_{etilt2}) \cdot \sin(\varphi_{escan2})\right) & \cdots & \exp\left(j \cdot 2\pi \cdot \frac{d_H}{\lambda} \cdot \sin(\theta_{etilt2}) \cdot \sin(\varphi_{escanQ_H})\right) \\ \vdots & \vdots & \ddots & \vdots \\ \exp\left(j \cdot 2\pi \cdot (N_H-1) \cdot \frac{d_H}{\lambda} \cdot \sin(\theta_{etilt2}) \cdot \sin(\varphi_{escan1})\right) & \exp\left(j \cdot 2\pi \cdot (N_H-1) \cdot \frac{d_H}{\lambda} \cdot \sin(\theta_{etilt2}) \cdot \sin(\varphi_{escan2})\right) & \cdots & \exp\left(j \cdot 2\pi \cdot (N_H-1) \cdot \frac{d_H}{\lambda} \cdot \sin(\theta_{etilt2}) \cdot \sin(\varphi_{escanQ_H})\right) \end{bmatrix}$$

$$\vdots$$

$$W_{H,Q_v} = \begin{bmatrix} 1 & 1 & \cdots & 1 \\ \exp\left(j \cdot 2\pi \cdot \frac{d_H}{\lambda} \cdot \sin(\theta_{etiltQ_v}) \cdot \sin(\varphi_{escan1})\right) & \exp\left(j \cdot 2\pi \cdot \frac{d_H}{\lambda} \cdot \sin(\theta_{etiltQ_v}) \cdot \sin(\varphi_{escan2})\right) & \cdots & \exp\left(j \cdot 2\pi \cdot \frac{d_H}{\lambda} \cdot \sin(\theta_{etiltQ_v}) \cdot \sin(\varphi_{escanQ_H})\right) \\ \vdots & \vdots & \ddots & \vdots \\ \exp\left(j \cdot 2\pi \cdot (N_H-1) \cdot \frac{d_H}{\lambda} \cdot \sin(\theta_{etiltQ_v}) \cdot \sin(\varphi_{escan1})\right) & \exp\left(j \cdot 2\pi \cdot (N_H-1) \cdot \frac{d_H}{\lambda} \cdot \sin(\theta_{etiltQ_v}) \cdot \sin(\varphi_{escan2})\right) & \cdots & \exp\left(j \cdot 2\pi \cdot (N_H-1) \cdot \frac{d_H}{\lambda} \cdot \sin(\theta_{etiltQ_v}) \cdot \sin(\varphi_{escanQ_H})\right) \end{bmatrix}$$

[Equation]

Here, $N_H$ is a number of horizontal antenna elements, $d_H$ is an interval (spacing) between horizontal antenna elements, $Q_H$ is determined to be a product of the number of horizontal antenna elements and an oversampling factor, and $\varphi_{escan}$ is a horizontal scan angle of a beam.

Preferably, the parameter for configuring a codebook C may include all angles in the one dimension of the beam.

Preferably, the parameter for configuring a codebook C may include the upper limit value and the lower limit value of an angle in the one dimension of a beam, and the angle in the one dimension of a beam generated from the codebook C may be uniformly determined based on a total numbers of the angle of the beam in the one-dimension within the upper limit value and the lower limit value.

Preferably, the parameter for configuring a codebook C may include the upper limit value and the lower limit value of an angle in the one dimension of a beam, and an angle between beams, and the angle in the one dimension of a beam generated from the codebook C may be uniformly determined with an interval (spacing) of an angle between beams from the upper limit value and the lower limit value.

Preferably, the parameter for configuring a codebook C may include the upper limit value and the lower limit value of an angle in the one dimension of a beam, and a weight applied to an angle between beams, and the angle in the one dimension of a beam generated from the codebook C may be non-uniformly determined based on the weight within the upper limit value and the lower limit value.

Preferably, the method may transmit a Precoding Matrix Indicator (PMI) indicating a precoding matrix selected in the codebook C to the BS.

Preferably, the vertical codebook $W_V$ may be configured by Equation below.

$$D_{(mn)}^{N_V \times N_V a} = \frac{1}{\sqrt{N_V}} e^{j\frac{2\pi(m-1)(n-1)}{N_V a}}, \quad \text{[Equation]}$$

$$m = 1, 2, \ldots, N_V, n = 1, 2, \ldots, N_V a$$

Here, $D_{(mn)}^{N_V \times N_V a}$ is a Discrete Fourier Transform (DFT) matrix, $N_V$ is a number of vertical antenna elements, and a is an oversampling factor.

Preferably, the horizontal codebook $W_H$ may be configured by Equation below.

$$D_{(mn)}^{N_H \times N_H a} = \frac{1}{\sqrt{N_H}} e^{j\frac{2\pi(m-1)(n-1)}{N_H a}} \quad \text{[Equation]}$$

Here, $D_{(mn)}^{N_H \times N_H a}$ is a Discrete Fourier Transform (DFT) matrix, $N_H$ is a number of horizontal antenna elements, and a is an oversampling factor.

Preferably, the parameter for configuring a codebook C may include a mechanical tilting angle, and the angle in the one-dimension of a beam generated from the codebook C may be determined by transforming a coordinate system for representing a direction of the beam based on the mechanical tilting angle.

Technical Effects

According to an embodiment of the present invention, particularly, in a wireless communication system environment that supports 3D MIMO system in which 2-dimensional active antenna system (2D-AAS) is used, a tilting angle is used by considering a position of a receiving-end, and accordingly, a codebook optimized for the receiving-end may be configured.

In addition, according to an embodiment of the present invention, a codebook optimized for the receiving-end is configured in a wireless communication system environment that supports 3D MIMO system, and accordingly, beamforming gain may be maximized.

Effects which may be obtained by the present invention are not limited to the aforementioned effects, and other effects that have not been described may be clearly understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

FIG. 1 illustrates the structure of a radio frame in a wireless communication system to which the present invention may be applied.

FIG. 2 is a diagram illustrating a resource grid for a downlink slot in a wireless communication system to which the present invention may be applied.

FIG. 3 illustrates a structure of downlink subframe in a wireless communication system to which the present invention may be applied.

FIG. 4 illustrates a structure of uplink subframe in a wireless communication system to which the present invention may be applied.

FIG. 5 shows the configuration of a known MIMO communication system.

FIG. 6 is a diagram showing a channel from a plurality of transmission antennas to a single reception antenna.

FIG. 7 is a diagram for describing a basic concept of a codebook-based precoding in a wireless communication system to which the present invention may be applied.

FIG. 8 illustrates reference signal patterns mapped to downlink resource block pairs in a wireless communication system to which the present invention may be applied.

FIG. 9 is a diagram illustrating resources to which reference signals are mapped in a wireless communication system to which the present invention may be applied.

FIG. 10 illustrates a 2D-AAS having 64 antenna elements in a wireless communication system to which the present invention may be applied.

FIG. 11 illustrates a system in which an eNB or UE has a plurality of transmission/reception antennas capable of forming a 3-Dimension (3D) beam based on the AAS in a wireless communication system to which the present invention may be applied.

FIG. 12 illustrates a 2D antenna system having cross-polarizations in a wireless communication system to which the present invention may be applied.

FIG. 13 illustrates a transceiver unit model in a wireless communication system to which the present invention may be applied.

FIG. 14 exemplifies geometric distribution of 2-dimensional AAS according to an embodiment of the present invention.

FIG. 15 exemplifies a vertical codebook according to an embodiment of the present invention.

FIG. 16 exemplifies a horizontal codebook according to an embodiment of the present invention.

FIG. 17 is a diagram for describing by comparing an electrical tilting scheme and a mechanical tilting scheme according to an embodiment of the present invention.

FIG. 18 is a diagram for describing an angle and a unit vector ($\hat{n}$) in the case that a mechanical down-tilt is applied according to an embodiment of the present invention.

FIG. 19 illustrates a coordinate system in the case that a mechanical down-tilt is applied according to an embodiment of the present invention.

FIG. 20 is a diagram illustrating a method for configuring a codebook according to an embodiment of the present invention.

FIG. 21 illustrates a block diagram of a wireless communication apparatus according to an embodiment of the present invention.

BEST MODE FOR INVENTION

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA),. Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to Which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10ms$.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot $2i$ and slot $2i+1$. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5ms$ length each. Each half frame includes 5 subframes of $30720*T\_s=1ms$ length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot $2i$ and slot $2i+1$ of $T\_slot=15360*T\_s=0.5ms$.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

TABLE 2

| | Normal cyclic prefix in downlink | | | Extended cyclic prefix in downlink | | |
| --- | --- | --- | --- | --- | --- | --- |
| | | UpPTS | | | UpPTS | |
| | | Normal | | | | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | | | | | | |

The structure of a radio subframe according to the example of FIG. 1 is just an example, and the number of subcarriers included in a radio frame, the number of slots included in a subframe and the number of OFDM symbols included in a slot may be changed in various manners.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \qquad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T \qquad \text{[Equation 2]}$$

Meanwhile, transmission power may be different in each of pieces of transmission information s_1, s_2, ..., s_NT. In this case, if pieces of transmission power are P_1, P_2, ..., P_NT, transmission information having controlled transmission power may be represented using the following vector.

$$\hat{s}=[\hat{s}_1, \hat{s}_2, \ldots, \hat{s}_{N_T}]^T=[P_1 s_1, P_2 s_2, \ldots, P_{N_T} s_{N_T}]^T \quad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector having controlled transmission power in the Equation 4 is multiplied by a weight matrix W, thus forming N_T transmission signals x_1, x_2, x_NT that are actually transmitted. In this case, the weight matrix functions to properly distribute the transmission information to antennas according to a transport channel condition. The following may be represented using the transmission signals x_1, x_2, ..., x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In this case, w_ij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, ..., y_NR of the respective antennas are represented as follows using a vector y.

$$y=[y_1, y_2, \ldots, y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T=[h_{i1}, h_{i2}, \ldots, h_{iN_T}] \quad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \quad \text{[Equation 8]}$$

Meanwhile, Additive White Gaussian Noise (AWGN) is added to an actual channel after the actual channel experiences the channel matrix H. Accordingly, AWGN n_1, n_2, ..., n_NR added to the N_R reception antennas, respectively, are represented using a vector as follows.

$$n=[n_1, n_2, \ldots, n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Hereinafter, in relation to the MIMO transport techniques described above, a codebook-based precoding technique will be described in detail.

FIG. 7 is a diagram for describing a basic concept of a codebook-based precoding in a wireless communication system to which the present invention may be applied.

According to the codebook-based precoding technique, a transmitting-end and a receiving end share codebook information that includes a predetermined number of precoding matrixes according to a transmission rank, the number of antennas, and so on.

That is, in the case that feedback information is finite, the precoding-based codebook technique may be used.

A receiving-end may measure a channel state through a receiving signal, and may feedback a finite number of preferred matrix information (i.e., index of the corresponding precoding matrix) based on the codebook information described above. For example, a receiving-end may measure a signal in Maximum Likelihood (ML) or Minimum Mean Square Error (MMSE) technique, and may select an optimal precoding matrix.

FIG. 7 shows that a receiving-end transmits the precoding matrix information for each codeword to a transmitting-end, but the present invention is not limited thereto.

The transmitting-end that receives the feedback information from the receiving-end may select a specific precoding matrix from the codebook based on the received information. The transmitting-end that selects the precoding matrix may perform precoding in a manner of multiplying layer signals, of which number amounts to a transmission rank, by the selected precoding matrix and may transmit the precoded transmission signal via a plurality of antennas. The number of rows in a precoding matrix is equal to the number of antennas, while the number of columns is equal to a rank value. Since the rank value is equal to the number of layers, the number of the columns is equal to the number of the layers. For instance, when the number of transmitting antennas and the number of layers are 4 and 2, respectively, a precoding matrix may include 4×2 matrix. Equation 12 below represents an operation of mapping information mapped to each layer to a respective antenna through the precoding matrix in the case.

$$\begin{bmatrix} y_1 \\ y_2 \\ y_3 \\ y_4 \end{bmatrix} = \begin{bmatrix} p_{11} & y_1 \\ p_{12} & y_1 \\ p_{13} & y_1 \\ p_{14} & y_1 \end{bmatrix} \cdot \begin{bmatrix} x_1 \\ x_2 \end{bmatrix} \quad \text{[Equation 12]}$$

Referring to Equation 12, information mapped to a layer includes $x_1$ and $x_2$ and each element $p_{ij}$ of 4×2 matrix is a weight used for precoding. $y_1$, $y_2$, $y_3$ and $y_4$ indicate information mapped to antennas and may be transmitted via corresponding antennas by OFDM transmission schemes, respectively.

The receiving-end that receives the signal precoded and transmitted in the transmitting-end may reconstruct the received signal by performing inverse processing of the precoding performed in the transmitting-end. Generally, since a precoding matrix satisfies such a unitary matrix (U) condition as '$U*U^H=I$' (herein, $U^H$ means an Hermit matrix of matrix U), the above-mentioned inverse processing of the precoding may be performed in a manner of multiplying the received signal by Hermit matrix $P^H$ of the precoding matrix P used for the precoding performed by the transmitting-end.

In addition, since the precoding is requested to have good performance for antenna configurations of various types, it may be necessary to consider performance for various antenna configurations in codebook design. In the following description, an exemplary configuration of multiple antennas is explained.

In the conventional 3GPP LTE system (e.g., system according to 3GPP LTE Release-8 or Release-9 Standard), since maximum four transmission antennas are supported in DL, a codebook for four transmission antennas is designed. In the 3GPP LTE-A system evolved from the conventional 3GPP LTE system, maximum eight transmission antennas may be supported in DL. Accordingly, it may be necessary to design a precoding codebook that provides good performance for a DL transmission via maximum eight transmission antennas.

Moreover, when a codebook is designed, generally required are constant modulus property, finite alphabet, restriction on a codebook size, nested property, and providing good performance for various antenna configurations.

The constant modulus property means a property that amplitude of each channel component of a precoding matrix configuring a codebook is constant. According to this property, no matter what kind of a precoding matrix is used, power levels transmitted from all antennas may be maintained equal to each other. Hence, it may be able to raise efficiency in using a power amplifier.

The finite alphabet means to configure precoding matrixes using quadrature phase shift keying (QPSK) alphabet (i.e., ±1, ±j) only except a scaling factor in the case of two transmitting antennas, for example. Accordingly, when multiplication is performed on a precoding matrix by a precoder, it may alleviate the complexity of calculation.

The codebook size may be restricted as a predetermined size or smaller. Since a size of a codebook increases, precoding matrixes for various cases may be included in the codebook, and accordingly, a channel status may be more accurately reflected. However, the number of bits of a precoding matrix indicator (PMI) correspondingly increases to cause signaling overhead.

The nested property means that a portion of a high rank precoding matrix is configured with a low rank precoding matrix. Thus, when the corresponding precoding matrix is configured, an appropriate performance may be guaranteed even in the case that a BS determines to perform a DL transmission of a transmission rank lower than a channel rank indicated by a rank indicator (RI) reported from a UE. In addition, according to this property, complexity of channel quality information (CQI) calculation may be reduced. This is because calculation for a precoding matrix selection may be shared in part when an operation of selecting a precoding matrix from precoding matrixes designed for different ranks is performed.

Providing good performance for various antenna configurations may mean that providing performance over a predetermined level is required for various cases including a low correlated antenna configuration, a high correlated antenna configuration, a cross-polarized antenna configuration and the like.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

FIG. 8 illustrates reference signal patterns mapped to downlink resource block pairs in a wireless communication system to which the present invention may be applied.

Referring to FIG. 8, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 8*a*) and has a length of 12 OFDM symbols in the case of an extended cyclic prefix (CP) (FIG. 8*b*). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, if the number of transmission antennas of an eNB is two, CRSs for a No. 0 antenna port and a No. 1 antenna port are transmitted. If the number of transmission antennas of an eNB is four, CRSs for No. 0~No. 3 antenna ports are transmitted. If the number of transmission antennas of an eNB is four, a CRS pattern in one RB is shown in FIG. 8.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

A DRS is described in more detail below. The DRS is used to demodulate data. In multi-input multi-output antenna transmission, precoding weight used for a specific UE is combined with a transmission channel transmitted by each transmission antenna when the UE receives an RS, and is used to estimate a corresponding channel without any change.

A 3GPP LTE system (e.g., Release-8) supports a maximum of four transmission antennas, and a DRS for rank 1 beamforming is defined. The DRS for rank 1 beamforming also indicates an RS for an antenna port index 5.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

For data demodulation, a DM-RS is dedicatedly transmitted to a UE scheduled in a corresponding time-frequency domain. That is, a DM-RS for a specific UE is transmitted only in a region in which the corresponding UE has been scheduled, that is, in the time-frequency domain in which data is received.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

For data demodulation, a DM-RS is dedicatedly transmitted to a UE scheduled in a corresponding time-frequency domain. That is, a DM-RS for a specific UE is transmitted only in the region in which scheduling is performed for the corresponding UE, that is, only in the time-frequency domain in which data is received.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined for only a subcarrier spacing $\Delta f=15$ kHz.

In a subframe configured for CSI-RS transmission, a CSI-RS sequence is mapped to a complex-valued modulation symbol $a\_k,l^{\char`\^}(p)$ used as a reference symbol on each antenna port p as in Equation 12.

$$a_{k,l}^{(p)} = w_{l''} \cdot r_{l,n_s}(m')$$

[Equation 12]

$$k = k' + 12m +
\begin{cases}
-0 & \text{for } p \in \{15, 16\}, \text{ normal cyclic prefix} \\
-6 & \text{for } p \in \{17, 18\}, \text{ normal cyclic prefix} \\
-1 & \text{for } p \in \{19, 20\}, \text{ normal cyclic prefix} \\
-7 & \text{for } p \in \{21, 22\}, \text{ normal cyclic prefix} \\
-0 & \text{for } p \in \{15, 16\}, \text{ extended cyclic prefix} \\
-3 & \text{for } p \in \{17, 18\}, \text{ extended cyclic prefix} \\
-6 & \text{for } p \in \{19, 20\}, \text{ extended cyclic prefix} \\
-9 & \text{for } p \in \{21, 22\}, \text{ extended cyclic prefix}
\end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 12, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 4 illustrates the mapping of (k',l') from a CSI-RS configuration in an extended CP.

TABLE 4

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

FIG. 9 is a diagram illustrating resources to which reference signals are mapped in a wireless communication system to which the present invention may be applied.

FIG. 9(a) shows twenty types of CSI-RS configurations available for CSI-RS transmission by one or two CSI-RS antenna ports, FIG. 9(b) shows ten types of CSI-RS configurations available for four CSI-RS antenna ports, and FIG. 9(c) shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 9(a).

Likewise, when four antenna ports are configured for CSI-RS transmission with respect to a specific cell, a CSI-RS is transmitted on radio resources on a configured CSI-RS configuration of the ten types of CSI-RS configurations shown in FIG. 9(b). Furthermore, when eight antenna ports are configured for CSI-RS transmission with respect to a specific cell, a CSI-RS is transmitted on radio resources on a configured CSI-RS configuration of the five types of CSI-RS configurations shown in FIG. 9(c).

A CSI-RS for each antenna port is subjected to CDM for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1 −1] and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1 −1] multiplied in order to detect the CSI-RS for the antenna port 16.

Referring to FIGS. 9(a) to 9(c), in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

A plurality of CSI-RS configurations may be used in one cell. 0 or one CSI-RS configuration may be used for a non-zero power (NZP) CSI-RS, and 0 or several CSI-RS configurations may be used for a zero power (ZP) CSI-RS.

For each bit set to 1 in a zeropower (ZP) CSI-RS ('ZeroPowerCSI-RS') that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T_CSI-RS and a subframe offset $\Delta$_CSI-RS for CSI-RS transmission are shown in Table 5.

Table 5 illustrates CSI-RS subframe configurations.

TABLE 5

| CSI-RS-SubframeConfig $I_{CSI\text{-}RS}$ | CSI-RS periodicity $T_{CSI\text{-}RS}$ (subframes) | CSI-RS subframe offset $\Delta_{CSI\text{-}RS}$ (subframes) |
| --- | --- | --- |
| 0-4 | 5 | $I_{CSI\text{-}RS}$ |
| 5-14 | 10 | $I_{CSI\text{-}RS}$-5 |
| 15-34 | 20 | $I_{CSI\text{-}RS}$-15 |
| 35-74 | 40 | $I_{CSI\text{-}RS}$-35 |
| 75-154 | 80 | $I_{CSI\text{-}RS}$-75 |

Referring to Table 5, the CSI-RS transmission period T_CSI-RS and the subframe offset $\Delta$_CSI-RS are determined depending on the CSI-RS subframe configuration I_CSI-RS.

The CSI-RS subframe configuration of Table 5 may be configured as one of the aforementioned 'SubframeConfig' field and 'zeroTxPowerSubframeConfig' field. The CSI-RS subframe configuration may be separately configured with respect to an NZP CSI-RS and a ZP CSI-RS.

A subframe including a CSI-RS satisfies Equation 13.

$$(10n_f + \lfloor n_s/2 \rfloor \Delta_{CSI\text{-}RS}) \bmod T_{CSI\text{-}RS} = 0 \quad \text{[Equation 13]}$$

In Equation 13, T_CSI-RS means a CSI-RS transmission period, $\Delta$_CSI-RS means a subframe offset value, n_f means a system frame number, and n_s means a slot number.

In the case of a UE in which the transmission mode 9 has been configured with respect to a serving cell, one CSI-RS resource configuration may be configured for the UE. In the case of a UE in which the transmission mode 10 has been configured with respect to a serving cell, one or more CSI-RS resource configuration (s) may be configured for the UE.

In the current LTE standard, a CSI-RS configuration includes an antenna port number (antennaPortsCount), a subframe configuration (subframeConfig), and a resource configuration (resourceConfig). Accordingly, the a CSI-RS configuration provides notification that a CSI-RS is transmitted how many antenna port, provides notification of the period and offset of a subframe in which a CSI-RS will be transmitted, and provides notification that a CSI-RS is transmitted in which RE location (i.e., a frequency and OFDM symbol index) in a corresponding subframe.

Specifically, the following parameters for each CSI-RS (resource) configuration are configured through high layer signaling.

If the transmission mode 10 has been configured, a CSI-RS resource configuration identifier A CSI-RS port number (antennaPortsCount): a parameter (e.g., one CSI-RS port, two CSI-RS ports, four CSI-RS ports or eight CSI-RS ports) indicative of the number of antenna ports used for CSI-RS transmission A CSI-RS configuration (resourceConfig) (refer to Table 3 and Table 4): a parameter regarding a CSI-RS allocation resource location A CSI-RS subframe configuration (subframeConfig, that is, I_CSI-RS) (refer to Table 5): a parameter regarding the period and/or offset of a subframe in which a CSI-RS will be transmitted If the transmission mode 9 has been configured, transmission power P_C for CSI feedback: in relation to the assumption of a UE for reference PDSCH transmission power for feedback, when the UE derives CSI feedback and takes a value within a [-8, 15] dB range in a 1-dB step size, P_C is assumed to be the ratio of energy per resource element (EPRE) per PDSCH RE and a CSI-RS EPRE.

If the transmission mode 10 has been configured, transmission power P_C for CSI feedback with respect to each CSI process. If CSI subframe sets C_CSI,0 and C_CSI,1 are configured by a high layer with respect to a CSI process, P_C is configured for each CSI subframe set in the CSI process.

A pseudo-random sequence generator parameter n_ID

If the transmission mode 10 has been configured, a high layer parameter 'qcl-CRS-Info-r11' including a QCL scrambling identifier for a quasico-located (QCL) type B UE assumption (qcl-ScramblingIdentity-r11), a CRS port count (crs-PortsCount-r11), and an MBSFN subframe configuration list (mbsfn-SubframeConfigList-r11) parameter.

When a CSI feedback value derived by a UE has a value within the [−8, 15] dB range, P_C is assumed to be the ration of PDSCH EPRE to CSI-RS EPRE. In this case, the PDSCH EPRE corresponds to a symbol in which the ratio of PDSCH EPRE to CRS EPRE is $\rho\_A$.

A CSI-RS and a PMCH are not configured in the same subframe of a serving cell at the same time.

In the frame structure type 2, if four CRS antenna ports have been configured, a CSI-RS configuration index belonging to the [20-31] set (refer to Table 3) in the case of a normal CP or a CSI-RS configuration index belonging to the [16-27] set (refer to Table 4) in the case of an extended CP is not configured in a UE.

A UE may assume that the CSI-RS antenna port of a CSI-RS resource configuration has a QCL relation with delay spread, Doppler spread, Doppler shift, an average gain and average delay.

A UE in which the transmission mode 10 and the QCL type B have been configured may assume that antenna ports 0-3 corresponding to a CSI-RS resource configuration and antenna ports 15-22 corresponding to a CSI-RS resource configuration have QCL relation with Doppler spread and Doppler shift.

In the case of a UE in which the transmission modes 1-9 have been configured, one ZP CSI-RS resource configuration may be configured in the UE with respect to a serving cell. In the case of a UE in which the transmission mode 10 has been configured, one or more ZP CSI-RS resource configurations may be configured in the UE with respect to a serving cell.

The following parameters for a ZP CSI-RS resource configuration may be configured through high layer signaling.

The ZP CSI-RS configuration list (zeroTxPowerResourceConfigList) (refer to Table 3 and Table 4): a parameter regarding a zero-power CSI-RS configuration The ZP CSI-RS subframe configuration (eroTxPowerSubframeConfig, that is, I_CSI-RS) (refer to Table 5): a parameter regarding the period and/or offset of a subframe in which a zero-power CSI-RS is transmitted A ZP CSI-RS and a PMCH are not configured in the same subframe of a serving cell at the same time.

In the case of a UE in which the transmission mode 10 has been configured, one or more channel state information—interference measurement (CSI-IM) resource configurations may be configured in the UE with respect to a serving cell.

The following parameters for each CSI-IM resource configuration may be configured through high layer signaling.

The ZP CSI-RS configuration (refer to Table 3 and Table 4)

The ZP CSI RS subframe configuration I_CSI-RS (refer to Table 5)

A CSI-IM resource configuration is the same as any one of configured ZP CSI-RS resource configurations.

A CSI-IM resource and a PMCH are not configured within the same subframe of a serving cell at the same time.

Massive MIMO

A MIMO system having a plurality of antennas may be called a massive MIMO system and has been in the spotlight as means for improving spectrum efficiency, energy efficiency and processing complexity.

In recent 3GPP, in order to satisfy the requirements of spectrum efficiency for a future mobile communication system, a discussion about the massive MIMO system has started. The massive MIMO is also called full-dimension MIMO (FD-MIMO).

In a wireless communication system after LTE Release (Rel)-12, the introduction of an active antenna system (AAS) is considered.

Unlike the existing passive antenna system in which an amplifier and antenna capable of adjusting the phase and size of a signal have been separated, the AAS means a system in which each antenna is configured to include an active element, such as an amplifier.

The AAS does not require a separate cable, connector and other hardware for connecting an amplifier and an antenna because the active antenna is used, and thus has a high efficiency characteristic in terms of energy and operating costs. In particular, the AAS enables an advanced MIMO technology, such as the formation of an accurate beam pattern or 3D beam pattern in which a beam direction and a beam width are considered because the AAS supports each electronic beam control method.

Due to the introduction of an advanced antenna system, such as the AAS, a massive MIMO structure having a plurality of input/output antennas and a multi-dimension antenna structure is also considered. For example, unlike in the existing straight type antenna array, if a two-dimensional (2D) antenna array is formed, a 3D beam pattern can be formed by the active antenna of the AAS.

FIG. 10 illustrates a 2D-AAS having 64 antenna elements in a wireless communication system to which the present invention may be applied.

FIG. 10 illustrates a common 2D antenna array. A case where $N\_t=N\_v \cdot N\_h$ antennas has a square form as in FIG. 10 may be considered. In this case, $N\_h$ indicates the number of antenna columns in a horizontal direction, and $N\_v$ indicates the number of antenna rows in a vertical direction.

If the antenna array of such a 2D structure is used, radio waves can be controlled both in the vertical direction (elevation) and the horizontal direction (azimuth) so that a transmission beam can be controlled in the 3D space. A wavelength control mechanism of such a type may be called 3D beamforming.

FIG. 11 illustrates a system in which an eNB or UE has a plurality of transmission/reception antennas capable of forming a 3D beam based on the AAS in a wireless communication system to which the present invention may be applied.

FIG. 11 is a diagram of the aforementioned example and illustrates a 3D MIMO system using a 2D antenna array (i.e., 2D-AAS).

From the point of view of a transmission antenna, if a 3D beam pattern is used, a semi-static or dynamic beam can be formed in the vertical direction of the beam in addition to the horizontal direction. For example, an application, such as the formation of a sector in the vertical direction, may be considered.

Furthermore, from the point of view of a reception antenna, when a reception beam is formed using a massive reception antenna, a signal power rise effect according to an antenna array gain may be expected. Accordingly, in the case of the uplink, an eNB can receive a signal from a UE through a plurality of antennas. In this case, there is an advantage in that the UE can set its transmission power very low by considering the gain of the massive reception antenna in order to reduce an interference influence.

FIG. 12 illustrates a 2D antenna system having cross-polarizations in a wireless communication system to which the present invention may be applied.

A 2D planar antenna array model in which polarization is considered may be diagrammed as shown in FIG. 12.

Unlike the existing MIMO system according to a passive antenna, a system based on an active antenna can dynamically control the gain of an antenna element by applying weight to an active element (e.g., an amplifier) to which each antenna element has been attached (or included). The antenna system may be modeled in an antenna element level because a radiation pattern depends on the number of antenna elements and an antenna arrangement, such as antenna spacing.

An antenna array model, such as the example of FIG. 12, may be represented by (M, N, P). This corresponds to a parameter that characterizes an antenna array structure.

M indicates the number of antenna elements having the same polarization in each column (i.e., the vertical direction) (i.e., the number of antenna elements having a +45° slant in each column or the number of antenna elements having a −45° slant in each column).

N indicates the number of columns in the horizontal direction (i.e., the number of antenna elements in the horizontal direction).

P indicates the number of dimensions of polarization. P=2 in the case of cross-polarization as in the case of FIG. 12, or P=1 in the case of co-polarization.

An antenna port may be mapped to a physical antenna element. The antenna port may be defined by a reference signal related to a corresponding antenna port. For example, in the LTE system, the antenna port 0 may be related to a cell-specific reference signal (CRS), and the antenna port 6 may be related to a positioning reference signal (PRS).

For example, an antenna port and a physical antenna element may be mapped in a one-to-one manner. This may correspond to a case where a single cross-polarization antenna element is used for downlink MIMO or downlink transmit diversity. For example, the antenna port 0 is mapped to one physical antenna element, whereas the antenna port 1 may be mapped to the other physical antenna element. In this case, from the point of view of a UE, two types of downlink transmission are present. One is related to a reference signal for the antenna port 0, and the other is related to a reference signal for the antenna port 1.

For another example, a single antenna port may be mapped to multiple physical antenna elements. This may correspond to a case where a single antenna port is used for beamforming. In beamforming, multiple physical antenna elements are used, so downlink transmission may be directed toward a specific UE. In general, this may be achieved using an antenna array configured using multiple columns of multiple cross-polarization antenna elements. In this case, from the point of view of a UE, one type of downlink transmission generated from a single antenna port is present. One is related to a CRS for the antenna port 0, and the other is related to a CRS for the antenna port 1.

That is, an antenna port indicates downlink transmission from the point of view of a UE not actual downlink transmission from a physical antenna element by an eNB.

For another example, a plurality of antenna ports is used for downlink transmission, but each antenna port may be mapped to multiple physical antenna elements. This may correspond to a case where an antenna array is used for downlink MIMO or downlink diversity. For example, each of the antenna ports 0 and 1 may be mapped to multiple physical antenna elements.

In this case, from the point of view of a UE, two types of downlink transmission. One is related to a reference signal for the antenna port 0, and the other is related to a reference signal for the antenna port 1.

In FD-MIMO, the MIMO precoding of a data stream may experience antenna port virtualization, transceiver unit (or a transmission and reception unit) (TXRU) virtualization, and an antenna element pattern.

In the antenna port virtualization, a stream on an antenna port is precoded on a TXRU. In the TXRU virtualization, a TXRU signal is precoded on an antenna element. In the antenna element pattern, a signal radiated by an antenna element may have a directional gain pattern.

In the existing transceiver modeling, a static one-to-one mapping between an antenna port and a TXRU is assumed, and a TXRU virtualization effect is joined into a static (TXRU) antenna pattern including the effects of the TXRU virtualization and the antenna element pattern.

The antenna port virtualization may be performed by a frequency-selective method. In LTE, an antenna port, together with a reference signal (or pilot), is defined. For example, for precoded data transmission on an antenna port, a DMRS is transmitted in the same bandwidth as a data signal, and both the DMRS and data are precoded by the same precoder (or the same TXRU virtualization precoding). For CSI measurement, a CSI-RS is transmitted through multiple antenna ports. In CSI-RS transmission, a precoder that characterizes mapping between a CSI-RS port and a TXRU may be designed in a unique matrix so that a UE can estimate a TXRU virtualization precoding matrix for a data precoding vector.

A TXRU virtualization method is discussed in 1D TXRU virtualization and 2D TXRU virtualization, which are described below with reference to the following drawing.

FIG. 13 illustrates a transceiver unit model in a wireless communication system to which the present invention may be applied.

In the 1D TXRU virtualization, M_TXRU TXRUs are related to M antenna elements configured in a single column antenna array having the same polarization.

In the 2D TXRU virtualization, a TXRU model configuration corresponding to the antenna array model configuration (M, N, P) of FIG. 12 may be represented by (M_TXRU, N, P). In this case, M_TXRU means the number of TXRUs present in the 2D same column and same polarization, and always satisfies M_TXRU≤M. That is, the total number of TXRUs is the same as M_TXRU×N×P.

A TXRU virtualization model may be divided into a TXRU virtualization model option−1: sub-array partition model as in FIG. 13(*a*) and a TXRU virtualization model option−2: full connection model as in FIG. 13(*b*) depending on a correlation between an antenna element and a TXRU.

Referring to FIG. 13(*a*), in the case of the sub-array partition model, an antenna element is partitioned into multiple antenna element groups, and each TXRU is connected to one of the groups.

Referring to FIG. 13(*b*), in the case of the full-connection model, the signals of multiple TXRUs are combined and transferred to a single antenna element (or the arrangement of antenna elements).

In FIG. 13, q is the transmission signal vectors of antenna elements having M co-polarizations within one column. W is a wideband TXRU virtualization vector, and W is a wideband TXRU virtualization matrix. X is the signal vectors of M_TXRU TXRUs.

In this case, mapping between an antenna port and TXRUs may be one-to-one or one-to-many.

In FIG. 13, mapping between a TXRU and an antenna element (TXRU-to-element mapping) shows one example, but the present invention is not limited thereto. From the point of view of hardware, the present invention may be identically applied to mapping between an TXRU and an antenna element which may be implemented in various forms.

Codebook Designing Method for a System Operating Based on 2D AAS

The present invention proposes a codebook design for 3D MIMO system in which 2-dimensional active antenna system (AAS) is installed (used).

Using antennas up to now, generally, beamforming is performed in a horizontal direction with a shape of uniformly deployed in a horizontal direction.

However, recently, as shown in the case of FIG. 10 and FIG. 12, an antenna of 2D shape in horizontal and vertical directions is considered in a next generation communication system.

FIG. 14 exemplifies geometric distribution of 2-dimensional AAS according to an embodiment of the present invention.

In FIG. 14, geometric distribution of 2D AAS equipped with $N_V \times N_H$ antenna elements (or antenna ports) is exemplified.

Referring to FIG. 14, $N_H$ antenna elements are located along y axis and $N_V$ antenna elements are located along z axis. In this case, it is exemplified that $N_V$ antenna elements are spaced apart as much as $d_V$ in a vertical direction and $N_H$ antenna elements are spaced apart as much as $d_H$ in a horizontal direction.

In addition, a dot shown in FIG. 14 may represent a cross polarized antenna element including the antenna element of +45° slant and the antenna element of −45° slant.

Here, an azimuth angle $\varphi$ and an elevation angle $\theta$ determine an antenna beam direction facing u position in FIG. 14.

An antenna array factor matrix $\tilde{W}$ may be represented as $\tilde{W}=W \cdot V$.

Here, matrix V represents a phase shift according to an antenna position configuration, and may be represented as Equation 13.

$$V = \quad \text{[Equation 13]}$$
$$[v_{1,1}, v_{1,2}, \ldots, v_{1,N_V}, \ldots, v_{N_H,1}, v_{N_H,2}, \ldots, v_{N_H,N_V}]^T$$
$$v_{m,n} = \exp\left(j \cdot 2\pi\left((n-1) \cdot \frac{d_V}{\lambda} \cdot \cos(\theta) + (m-1) \cdot \frac{d_H}{\lambda} \cdot \sin(\theta) \cdot \sin(\varphi)\right)\right),$$
$$m = 1, 2, \ldots, N_H; n = 1, 2, \ldots, N_V;$$

Here, exp( ) represents an exponential function, and $\lambda$ represents a wavelength.

In addition, matrix W is a weighting factor (i.e., weighting vector or precoding vector) that enables a side lobe level adjustment and an electrical steering of horizontal and vertical directions.

A phase of weighting vector W is given as a function of horizontal and vertical steering angle and an interval (spacing) between each of antenna elements.

$$W = \quad \text{[Equation 14]}$$
$$[w_{1,1}, w_{1,2}, \ldots, w_{1,N_V}, \ldots, w_{N_H,1}, w_{N_H,2}, \ldots, w_{N_H,N_V}]^T$$
$$w_{m,n} = \frac{1}{\sqrt{N_H N_V}} \exp\left(-j \cdot 2\pi\left((n-1) \cdot \frac{d_V}{\lambda} \cdot \cos(\theta_{etilt}) + (m-1) \cdot \frac{d_H}{\lambda} \cdot \sin(\theta_{etilt}) \cdot \sin(\varphi_{escan})\right)\right),$$
$$m = 1, 2, \ldots, N_H; n = 1, 2, \ldots, N_V;$$

In Equation 14, $\theta_{etilt}$ is an electrical down-tilt steering, and represents upward/downward angle of an antenna beam based on a horizontal plane in a vertical dimension. This may be referred to as (antenna) downward/upward-tilt or (vertical) tilting angle. $\varphi_{escan}$ is an electrical steering in a horizontal direction, and represents an angle between a specific boresight and a direction of interest of an antenna in a horizontal dimension. This may be referred to as (horizontal) scan angle (or (horizontal) tilting angle). As exemplified in Equation 14 above, $\theta_{etilt}$ is represented in $\sin(\theta_{etilt}) \cdot \sin(\theta_{escan})$ form, and influences on a horizontal steering as well as a vertical steering.

Considering Equations 13 and 14 above, in order to maximize a beamforming gain, it is preferable to optimize $\theta_{etilt}$ and $\varphi_{escan}$ by considering a position of a UE, and design a codebook based on the optimized $\theta_{etilt}$ and $\theta_{escan}$.

Meanwhile, Discrete Fourier Transform (DFT) matrix may be used for a codebook for a beamforming vector.

The DFT matrix (D) is defined as Equation 15 below.

$$D_{(mn)}^{M \times Ma} = \frac{1}{\sqrt{M}} e^{j\frac{2\pi(m-1)(n-1)}{Ma}} \quad \text{[Equation 15]}$$

In Equation 15, $m=1,2,\ldots,M$ and $n=1,2,\ldots,M \cdot a$. Here, M means a size of antenna array (i.e., the number of total antenna ports). In addition, (mn) means an element of (m, n) in matrix D. j is an imaginary unit/unit imaginary number. a is an oversampling factor.

Basically, in matrix D, each of the elements may have a form in which a phase increase linearly in a column. Accordingly, in nth column of matrix D, phase of each of the elements is increased as much as $$\frac{2\pi(n-1)}{Ma}.$$

The DFT matrix (D) has a property in well accordance with Equation 14 above, and accordingly, a codebook using the DFT matrix has been widely used.

However, in Equations 14 and 15, in the codebook using the DFT matrix, the relation between antenna elements is well reflected, but $\theta_{etilt}$ and $\varphi_{escan}$ are not properly reflected. In other word, in the case of the codebook using the DFT matrix, since a position of UE is not properly considered, there is a disadvantage that the codebook optimized to the corresponding UE is unable to be applied.

Accordingly, the present invention proposes a method of configuring the whole or a portion of a codebook by the codes in which the property of the DFT matrix and $\theta_{etilt}$ and $\varphi_{escan}$.

When the codebook using the DFT matrix is extended to 2D AAS, it may be simply extended by using Kronecker product technique of a weight vector in a horizontal direction and a weight vector of a vertical direction. A current codebook using the DFT matrix has a structure as represented in Equation 16 below.

$$W = W_1 W_2 = (W_{1H} \otimes W_{1V})(W_{2H} \otimes W_{2V})$$ [Equation 16]

In Equation 16, $W_1$ represents a long-term property of a channel, and may be fed back in a wideband unit. $W_1$ may be referred to as a first PMI.

$W_2$ represents a short-term property of a channel, and may be fed back in a subband unit, and performs a role of selection and co-phasing (e.g., in the case of a cross polarization antenna). $W_2$ may be referred to as a second PMI.

In addition, subscripts H and V mean a horizontal direction and a vertical direction, respectively. And $\otimes$ means Kronecker product.

$W_{1V}$ may be selected as a 'subset of D matrix' configured by one or more columns in the DFT codebook (matrix D) in a vertical direction.

The DFT codebook (matrix D) in a horizontal direction may be configured as Equation 17 below.

$$D_{(mn)}^{N_V \times N_V a} = \frac{1}{\sqrt{N_V}} e^{j\frac{2\pi(m-1)(n-1)}{N_V a}}$$ [Equation 17]

In Equation 17, $m=1,2,\ldots,N_V$ and $n=1,2,\ldots,N_V a$. In addition, in the DFT codebook of Equation 17, a is an oversampling factor, and $N_V$ is the number of vertical antenna elements.

In addition, similarly, $W_{1H}$ may be selected as 'subset of D matrix' configured by one or more columns in the DFT codebook (matrix D) in a horizontal direction.

The DFT codebook (matrix D) in a horizontal direction may be configured as Equation 18 below.

$$D_{(mn)}^{N_H \times N_H a} = \frac{1}{\sqrt{N_H}} e^{j\frac{2\pi(m-1)(n-1)}{N_H a}}$$ [Equation 18]

In Equation 18, $m=1,2,\ldots,N_H$ and $n=1,2,\ldots,N_H a$. In addition, in the DFT codebook of Equation 18, a is an oversampling factor, and $N_H$ is the number of horizontal antenna elements.

The present invention proposes a method for designing $W_{1H}$ and $W_{1V}$ configuring $W_1$.

The method proposed in the present invention may be applied to the structure of Equation 16, but not limited thereto, and may be applied to a general codebook.

In the present invention, a vertical codebook is designated as $W_V$ and a horizontal codebook is designated as $W_H$.

A shape of $W_V$ proposed in the present invention is as the Equation exemplified in FIG. 15.

FIG. 15 exemplifies a vertical codebook according to an embodiment of the present invention.

In the Equation exemplified in FIG. 15, $N_V$ represents the number of antenna elements in a vertical direction. Furthermore, $Q_V$ means the number of column configuring $W_V$ (i.e., the number of total vertical tilting angles), and for example, $Q_V$ may be represented as a product of the number of antenna vertical elements and an oversampling factor.

A shape of $W_H$ according to an embodiment of the present invention is as the Equation exemplified in FIG. 16.

FIG. 16 exemplifies a horizontal codebook according to an embodiment of the present invention.

In the Equation exemplified in FIG. 16, $N_H$ represents the number of antenna elements in a horizontal direction. Furthermore, each of $W_{H,i}$ ($i=1,\ldots,Q_V$) is configured by $Q_H$ columns. That is, $Q_H$ means the number of columns (i.e., the number of total horizontal scan angles) configuring $W_{H,i}$. For example, $Q_H$ may be represented as a product of the number of horizontal elements of an antenna and an oversampling factor.

In describing the elements configuring $W_{H,i}$ ($i=1,\ldots,Q_V$) with reference to the Equation exemplified in FIG. 16, since $\theta_{etilt}$ and $\varphi_{escan}$ are interconnected with each other in the form of $\sin(\theta_{etilt})\cdot\sin(\varphi_{escan})$ (That is, since they constitutes one monomial), $W_H$ may be represented as a matrix in a form of function of $\theta_{etilt}$.

Here, the oversampling factor with respect to horizontal and vertical components may be the same or different according to an embodiment.

$W_V$ exemplified in FIG. 15 may be referred to as a first PMI, and $W_H$ exemplified in FIG. 16 may be referred to as a second PMI. In this case, $W_2$ may be referred to as a third PMI.

When $W_H$ is represented in a matrix in a form of function of $\theta_{etilt}$ as in the Equation exemplified FIG. 16, the whole codebook C (fat matrix) may be represented as Equation 19 below.

$$C = [W_{H,1} \otimes W_V(:,1) \ W_{H,2} \otimes W_V(:,2) \ldots W_{H,Q_V} \otimes W_V(:,Q_V)]$$ [Equation 19]

In Equation 19, $W_V(:,i)$, $i=1,\ldots,Q_V$ means $i^{th}$ column in $W_V$ matrix. In this case, the number of beams configuring C is $Q_H \times Q_V$.

At this time, depending on a system using a codebook, C may be used as the whole codebook.

Otherwise, in the case of a codebook of dual form as represented in Equation 16 above, according to the bit number (i.e., bit number of PMI) that a reception UE feedbacks to an eNB, a subset of C may be used as $W_1$ matrix.

As a more particular example, when the feedback bit number of $W_1$ and $W_2$ is defined as $L_1$ and $L_2$, respectively, according to a specific rule or an appointment with an eNB, $2^{L_1}$ subsets of C including $2^{L_2}$ columns may configure a candidate of $W_1$, and a reception UE may report an index of $2^{L_1}$ candidate of $W_1$.

Hereinafter, a method for determining $\theta_{etilt}$ and $\varphi_{escan}$ in the Equation exemplified in FIG. 15 and in the Equation exemplified in FIG. 16 will be described.

For the convenience of description, a method for determining $\theta_{etilt}$ is mainly described below, but the present invention is not limited thereto.

1-A) According to an embodiment of the present invention, an eNB and a receiving-end may appoint $\theta_{etilt,i}$ values with each other.

Through a measurement or a simulation in advance, the eNB may calculate an optimized electrical tilting angle by considering a peripheral environment of a UE (channel, antenna configuration, TXRU virtualization, etc.), and may inform it to the UE.

For example, in the case that there are four vertical TXRUs and spacing of each TXRU is 0.8λ, it is assumed that the optimized tilting angle is determined to be 71.8°, 90°, 108.2° and 128.7° in the eNB. In this case, the eNB may inform the four tilting angle values and 0.8λ value to the reception UE. Otherwise, the eNB may inform the whole phase values $$2\pi \cdot \frac{d_V}{\lambda} \cdot \cos(\theta_{etilt})$$

calculated as 71.8°, 90°, 108.2° and 128.7°.

In this case, the eNB may inform the values described above (e.g., tilting angles or the whole phase values) explicitly to the reception UE through an RRC signaling.

Otherwise, the eNB may inform the values described above to the reception UE through an RRC signaling using a bitmap technique.

2-B) According to another embodiment of the present invention, an eNB may inform an upper limit value and/or a lower limit value of $\theta_{etilt,i}$ value to a UE.

Considering the range that a vertical beam should cover according to peripheral environment like a position of UE and the like, the range of $\theta_{etilt}$ is 0° to 180° as exemplified in FIG. 14 above. However, considering an actual environment, there is little possibility that reception UEs located in a specific angle (e.g., 0° and 180°, extremely) are existed. Accordingly, when an electrical tilting (etilting) angle is determined using a vertical component, a method of considering an upper limit value and a lower limit value is efficient by considering environment such as a position of a reception UE. Furthermore, it may be beneficial in the aspect of a system performance to uniformly distribute (determine) or to non-uniformly determine an electrical tilting (etilting) angle based on an upper limit value and a lower limit value.

Accordingly, in the present invention, when an eNB determines and informs an upper limit value and/or a lower limit value to a UE, it is proposed a method of calculating $\theta_{etilt}$. The upper limit value and the lower limit value of $\theta_{etilt}$ are defined as $\theta_{max}$ and $\theta_{min}$, respectively, and the relation $\theta_{min} \leq \theta_{etilt} \leq \theta_{max}$ is established.

i) Uniform Scheme

1) $W_V$ is configured by columns of $Q_V$. A reception UE may calculate $\theta_{etilt,i}$ value which is a difference between phases of each column as represented in Equation 20 and Equation 21, by using the upper limit value and the lower limit value of $\theta_{etilt}$ received from an eNB.

$$\theta_{etilt,i} = \theta_{min} + (i-1) \cdot \frac{\theta_{max} - \theta_{min}}{Q_v - 1}, \ i = 1, \ldots, Q_v \quad \text{[Equation 20]}$$

$$\theta_{etilt,i} = \theta_{max} - (i-1) \cdot \frac{\theta_{max} - \theta_{min}}{Q_v - 1}, \ i = 1, \ldots, Q_v \quad \text{[Equation 21]}$$

2) An eNB may inform a lower limit value and an angle between beams (e.g., a step size) to a UE. Otherwise, an eNB may inform an upper limit value and an angle between beams.

In this case, based on the information received from an eNB, a UE may calculate a codebook configured by uniform beams in a limited angle. For example, it is assumed that a lower limit value is 60°, a step size angle is 10°, and $N_v=2$, $Q_v=4$, and $d_v=0.8\lambda$. In this case, a UE may know tilting angles of beams configure {60°, 70°, 80°, 90°}, and the completed codebook is as represented in Equation 22 below.

$$W_V = \begin{bmatrix} 1 & 1 & 1 & 1 \\ \exp(j \cdot 2\pi \cdot & \exp(j \cdot 2\pi \cdot & \exp(j \cdot 2\pi \cdot & \exp(j \cdot 2\pi \cdot \\ 0.8 \cdot \cos & 0.8 \cdot \cos & 0.8 \cdot \cos & 0.8 \cdot \cos \\ \left(\frac{60}{180}\pi\right)) & \left(\frac{70}{180}\pi\right)) & \left(\frac{60}{180}\pi\right)) & \left(\frac{90}{180}\pi\right)) \end{bmatrix} \quad \text{[Equation 22]}$$

In order to use scheme 1) or 2) described above, a UE may receive values such as $\theta_{max}$ and/or $\theta_{min}$, $Q_v$, $N_v$ and the like from an eNB through an RRC signaling.

Here, $Q_v$ may be configured by a product of $N_v$ and an oversampling factor a. Alternatively, $Q_v$ may be determined to be $2^{L_V}$, when a feedback bit number for a vertical component is given by $L_V$. In this case, a UE may be signaled with a or $L_V$ value instead of $Q_V$ from an eNB.

ii) Non-uniform Scheme

In comparison with the scheme in which an angle between an upper limit and a lower limit of $\theta_{etilt,i}$ of beams in a codebook is uniformly determined, in a non-uniform scheme, $\theta_{etilt,i}$ values may be non-uniformly determined between an upper limit and a lower limit. Particularly, the scheme in which $\theta_{etilt,i}$ value is non-uniformly determined as such may be efficient for the case that reception UEs are gathered in a specific position of a vertical direction (e.g., in the case that a hot spot is existed).

1) The values of $\theta_{etilt,i}$ may be determined in a specific non-uniform distribution shape like the Gaussian distribution, for example.

That is, relatively many $Q_v$ beams in a codebook $W_v$ are configured based on a specific $\theta_{etilt}$ that corresponds to a hot spot, and relatively small number of beams are configured near to an upper limit and a lower limit. As an example of this scheme, a codebook may be configured by multiplying a weight and an angle between beams.

2) In the embodiment of section 1) above, it is assumed that there is one hot spot, but the similar scheme may also be applied when there are several hot spots and a hot spot is weighted to a specific angle.

In order to use scheme 1) or 2) described above, a UE may be receive values such as $\theta_{max}$ and/or $\theta_{min}$, $Q_v$, $N_v$, weight, and the like from an eNB through an RRC signaling.

Heretofore, a method for configuring $\theta_{etilt}$ value has been proposed. Very similar to this, when a value of $\theta_{etilt}$ is fixed (i.e., determined to be a specific value), values of $\varphi_{escan}$ may be determined through the same method, and through this, $W_H$ of the Equation exemplified in FIG. 16, which is a codebook that corresponds to a horizontal scan angle component, may be configured. For example, when a value of $\theta_{etilt}$ is fixed (i.e., determined to be a specific value), similar to 1-A) or 1-B) scheme described above, $W_H$ of the Equation exemplified in FIG. 16 may be configured.

More particularly, when 1-A) scheme is used, an eNB may explicitly inform all horizontal scan angles of a beam, or the whole phase values calculated with the corresponding scan angle to a UE.

In addition, when a uniform scheme is used in 1-B) scheme, an eNB may inform an upper limit value and a lower limit value of a horizontal scan angle of a beam to a UE, and the horizontal scan angle of a beam may be uniformly determined based on $Q_H$ in the range of an upper limit value and a lower limit value. Alternatively, an eNB may inform an upper limit value and a lower limit value of a horizontal scan angle of a beam and a horizontal angle between beams to a UE, and the horizontal scan angle of a beam may be uniformly determined to be a horizontal angle interval (spacing) between beams in the range of an upper limit value and a lower limit value.

Furthermore, when a uniform scheme is used in 1-B) scheme, an eNB may inform an upper limit value and a lower limit value of a horizontal scan angle of a beam and a weight applied to an angle between beams to a UE, and the horizontal scan angle of a beam may be non-uniformly determined based on a weight between beams in the range of an upper limit value and a lower limit value.

A method of configuring the whole codebook is as described below.

2-A) The whole codebook may be configured by Kronecker product of $W_V$ configured by the Equation exemplified in FIG. 15 and $W_H$ configured by the existing DFT matrix.

2-B) Alternatively, the whole codebook may be configured by Kronecker product of $W_H$ configured by the Equation exemplified in FIG. 16 and $W_V$ configured by the existing DFT matrix.

In this case, an eNB and a UE may appoint in advance that $\theta_{etilt}$ of $W_H$ is fixed to a specific value (e.g., $\theta_{etilt}=90°$), and the UE may configure $W_H$ by calculating $\varphi_{escan}$ values based on the fixed $\theta_{etilt}$.

Alternatively, in the case that an eNB informs a specific $\theta_{etilt}$ value to a reception UE, the UE may configure $W_H$ using the received $\theta_{etilt}$ value.

2-C) Alternatively, the whole codebook may be configured by using Equation 19 above based on the matrixes of $W_V$ configured by the Equation exemplified in FIG. 15 or $W_H$ configured by the Equation exemplified in FIG. 16.

Heretofore, as exemplified in Equations 13 and 14 above, it is proposed a codebook design using an electrical tilting that has a tilting effect of an antenna by adjusting a phase of the DFT matrix.

Different from it, a method of tilting an antenna physically may be referred to as a mechanical tilting.

FIG. 17 is a diagram for describing by comparing an electrical tilting scheme and a mechanical tilting scheme according to an embodiment of the present invention.

FIG. 17(a) exemplifies the case that a tilting is not applied and FIG. 17(b) exemplifies the case that an electrical tilting is applied. FIG. 17(c) exemplifies the case that a mechanical tilting is applied.

In the case that a tilting is not applied as shown in FIG. 17(a), signals input to each of the antenna elements have the same phase, and a beam has a horizontal shape.

In the case that an electrical tilting is applied as shown in FIG. 17(b), phases of signals input to each of the antenna elements are different, and owing to this, a beam has a shape of lower direction than a horizontal direction.

In the case that a mechanical tilting is applied as shown in FIG. 17(c), signals input to each of the antenna elements have the same phase but the antenna itself is tilted, and owing to this, a beam has a shape of lower direction than a horizontal direction.

Hereinafter, a codebook design considering a mechanical tilt is proposed.

For this, the case that a mechanical down-tilt as much as $\beta°$ is considered in FIG. 14 above, this is illustrated as shown in FIG. 18 below.

FIG. 18 is a diagram for describing an angle and a unit vector ($\hat{n}$) in the case that a mechanical down-tilt is applied according to an embodiment of the present invention. Here, a rotational angle $\psi$ of a unit vector by mechanical tilting $\beta°$ is defined as $\psi=\arg(\sin\theta\cos\beta-\cos\varphi\cos\theta\sin\beta+j\sin\varphi\sin\beta)$.

In FIG. 18, it is exemplified the case of being down-tilted as much as $\beta°$ about the y axis.

When it is mechanically down-tilted as much as $\beta°$ in spherical coordinate, (x, y, z), which represents the existing coordinate system is transformed to (x', y', z'), which is a new coordinate system. Since a coordinate system moves as much as $\beta°$ in downwardly about the y axis, there is no change in the y axis as the same as FIG. 18. However, since the coordinate system that corresponds to x and z axes moves, an azimuth angle $\varphi$ and an elevation angle $\theta$ are transformed to $\varphi'$ and $\theta'$, respectively. In this case, the definitions of and $\varphi'$ and $\theta'$ are as represented in Equations 23 and 24 below.

$$\theta'=\arccos(\cos\varphi\sin\theta\sin\beta+\cos\theta\cos\beta) \quad \text{[Equation 23]}$$

$$\varphi'=\arg(\cos\varphi\sin\theta\sin\beta-\cos\theta\cos\beta+j\sin\varphi\sin\theta) \quad \text{[Equation 24]}$$

In Equation 23, arccos represents an inverse function of cos function, and in Equation 23, arg represents an argument operation of a complex number.

Accordingly, in the case of a system considering a mechanical tilting, by using Equations 23 and 24 above, the codebook design using an electrical tilting described in the front part of the present invention may be applied without any change. The method for applying it is as described below.

3-A) According to an embodiment of the present invention, in addition to the information signaled in the codebook design scheme (i.e., 1-A) scheme or 1-B) scheme described above) using an electrical tilting scheme, an eNB additionally informs $\beta$ to a reception UE.

By using $\beta$ and Equation 23 and Equation 24 above, an azimuth angle $\varphi'$ and an elevation angle $\theta'$ may be calculated. Through this, a codebook may be calculated as represented in the Equation exemplified in Equation 15 and/or the Equation exemplified in FIG. 16 above. That is, in the Equation exemplified in Equation 15, $\varphi$ is substituted by $\varphi'$, and in the Equation exemplified in FIG. 16, $\theta$ is substituted by $\theta'$, and accordingly, each of $W_V$ and $W_H$ may be calculated.

In this case, a method of configuring the whole codebook is as below.

i) $W_1$ may be configured by Kronecker product of $W_V$ configured by $\beta$ and Equations 23 and 24 above and $W_H$ configured by the existing DFT matrix.

ii) $W_1$ may be configured by Kronecker product of $W_H$ configured by $\beta$ and Equations 23 and 24 above and the Equation exemplified in FIG. 16 above and $W_H$ configured by the existing DFT matrix.

iii) $W_1$ may be configured by Kronecker product of $W_V$ configured by $\beta$ and Equations 23 and 24 above and the Equation exemplified in FIG. 15 above and $W_H$ configured by $\beta$ and Equations 23 and 24 above and the Equation exemplified in FIG. 16 above.

3-B) According to another embodiment of the present invention, in the case of configuring a codebook using 3-A) scheme above, since a tilting period of a mechanical tilting may be relatively longer than that of an electrical tilting, $\beta$ may be signaled with a longer period than an azimuth angle $\varphi$ and an elevation angle $\theta$.

Meanwhile, the case of being down-tilted as much as $\beta$ about the y axis is considered in FIG. 18 above, but the present invention is not limited thereto, and may be generalized to the case of being rotated as much as $\alpha$, $\beta$, $\gamma$ about x, z and y axes, respectively.

FIG. 19 illustrates a coordinate system in the case that a mechanical down-tilt is applied according to an embodiment of the present invention.

In FIG. 19, it is illustrated the case of steering as much as $\alpha$, $\beta$, $\gamma$ angles in x, z and y axes about an origin of coordination (i.e., about x, z and y axes).

In the case of steering $\alpha$ angle in the x axis, the coordinate system is represented as (x', y', z'), further to this, in the case of steering $\beta$ angle in the z axis, the coordinate system is represented as (x'', y'', z''), and further to this, in the case of steering $\gamma$ angle in the y axis, the coordinate system is represented as (x''', y''', z''').

As shown in FIG. 19, in the case of steering as much as α, β, γ angles in x, z and y axes, respectively, Equations 23 and 24 may be generalized and represented as Equations 25 and 26 below.

$$\hat{\rho} = \begin{bmatrix} x \\ y \\ z \end{bmatrix} = \begin{bmatrix} \sin\theta\cos\phi \\ \sin\theta\sin\phi \\ \cos\theta \end{bmatrix}$$

is a parameter for transform the spherical coordinate system to the Cartesian coordinate system.

$$\theta'(\alpha, \beta, \gamma; \theta, \phi) = \arccos\left(\begin{bmatrix} 0 \\ 0 \\ 1 \end{bmatrix}^T R^{-1}\hat{\rho}\right) = a\cos(\cos\beta\cos\gamma\cos\theta + (\sin\beta\cos\gamma\cos(\phi-\alpha) - \sin\gamma\sin(\phi-\alpha))\sin\theta) \quad \text{[Equation 25]}$$

$$\phi'(\alpha, \beta, \gamma; \theta, \phi) = \arg\left(\begin{bmatrix} 1 \\ j \\ 0 \end{bmatrix}^T R^{-1}\hat{\rho}\right) = \arg\left(\begin{array}{l}(\cos\beta\sin\theta\cos(\phi-\alpha) - \sin\beta\cos\theta) + \\ j\left(\cos\beta\sin\gamma\cos\theta + \left(\begin{array}{l}\sin\beta\sin\gamma\cos(\phi-\alpha) + \\ \cos\gamma\sin(\phi-\alpha)\end{array}\right)\sin\theta\right)\end{array}\right) \quad \text{[Equation 26]}$$

In Equations 25 and 26, matrix R means a rotational matrix that reflects the case of rotating as much as α, β, γ angles in x, z and y axes, respectively, and as represented in Equation 27 below. On the other hand, an inverse function of matrix R is as represented in Equation 28 below.

$$R = \begin{pmatrix} \cos\alpha\cos\beta & \begin{array}{l}\cos\alpha\sin\beta\sin\gamma - \\ \sin\alpha\cos\gamma\end{array} & \begin{array}{l}\cos\alpha\sin\beta\cos\gamma + \\ \sin\alpha\sin\gamma\end{array} \\ \sin\alpha\cos\beta & \begin{array}{l}\sin\alpha\sin\beta\sin\gamma + \\ \cos\alpha\cos\gamma\end{array} & \begin{array}{l}\sin\alpha\sin\beta\cos\gamma - \\ \cos\alpha\sin\gamma\end{array} \\ -\sin\beta & \cos\beta\sin\gamma & \cos\beta\cos\gamma \end{pmatrix} \quad \text{[Equation 27]}$$

$$R^{-1} = \begin{pmatrix} \cos\alpha\cos\beta & \sin\alpha\cos\beta & -\sin\beta \\ \begin{array}{l}\cos\alpha\sin\beta\sin\gamma - \\ \sin\alpha\cos\gamma\end{array} & \begin{array}{l}\sin\alpha\sin\beta\sin\gamma + \\ \cos\alpha\cos\gamma\end{array} & \cos\beta\sin\gamma \\ \begin{array}{l}\cos\alpha\sin\beta\cos\gamma + \\ \sin\alpha\sin\gamma\end{array} & \begin{array}{l}\sin\alpha\sin\beta\cos\gamma - \\ \cos\alpha\sin\gamma\end{array} & \cos\beta\cos\gamma \end{pmatrix} \quad \text{[Equation 28]}$$

The codebook considering a mechanical tilt which is generalized using Equations 25 and 26 may be configured by the method described above.

FIG. 20 is a diagram illustrating a method for configuring a codebook according to an embodiment of the present invention.

Referring to FIG. 20, a UE receives a parameter for configuring a codebook C from an eNB (step, S2001).

In this case, the parameter for configuring a codebook C may include one or more of an upper limit value and a lower limit value of an angle in one-dimension of a beam. Here, the one-dimension may mean at least one of a vertical dimension and a horizontal dimension. That is, the parameter for configuring a codebook C may include may include one or more of an upper limit value and a lower limit value of a tilting angle in a vertical direction of a beam, or may include one or more of an upper limit value and a lower limit value of a horizontal scan angle, or may include one or more of an upper limit value and a lower limit value of a tilting angle in a vertical direction and one or more of an upper limit value and a lower limit value of a horizontal scan angle.

More particularly, when 1-A) method above is used, the parameter for configuring a codebook C may include all angles in the one-dimension of a beam (i.e., all tilting angles in a vertical direction and/or all scan angles of a horizontal direction of a beam).

Alternatively, when the uniform scheme in 1-B) method above is used, the parameter for configuring a codebook C may include an upper limit value and/or a lower limit value of an angle (i.e., tilting angle in a vertical direction and/or scan angle in a horizontal direction of a beam) in the one-dimension of a beam, and additionally, may include values such as total numbers of an angle of a beam in the one-dimension (i.e., $Q_v$ and/or $Q_H$), $N_v$ (and/or $N_H$), an angle (step size) between beams (i.e., vertical tilting angle difference between beams in the case of a vertical direction and scan angle difference between beams in the case of a horizontal direction), and the like.

Alternatively, when the non-uniform scheme in 1-B) method above is used, the parameter for configuring a codebook C may include an upper limit value and/or a lower limit value of an angle (i.e., tilting angle in a vertical direction and/or scan angle in a horizontal direction of a beam) in the one-dimension of a beam, and additionally, may include values such as total numbers of an angle of a beam in the one-dimension (i.e., $Q_v$ and/or $Q_H$), $N_v$ (and/or $N_H$), a weight applied to an angle between beams (i.e., a weight applied to vertical tilting angle difference between beams in the case of a vertical direction and a weight applied to scan angle difference between beams in the case of a horizontal direction), and the like.

Alternatively, when the mechanical tilting is used by an eNB, the parameter for configuring a codebook C may further include rotational angles (α, β, γ) in each axis (x, y, z) of the coordinate system that represents a direction of a beam.

In this case, the parameter for configuring a codebook C may be forwarded through a high layer signaling (e.g., RRC signaling).

The UE configures a codebook C using the parameter for configuring a codebook C received from the eNB (step, S2002).

That is, the UE may configure a codebook C based on the vertical direction tilting angle θ' and/or the horizontal direction scan angle φ' using the parameter for configuring a codebook C through the method exemplified in FIG. 14 to FIG. 19 above.

More particularly, when 1-A) method above is used, a codebook C may be configured for generating a beam that has all angles (i.e., all tilting angles in a vertical direction and/or all scan angles in a horizontal direction of a beam) in the one-dimension of a beam which is received from the eNB.

Alternatively, when the uniform scheme in 1-B) method above is used, a codebook C may be configured such that an angle (i.e., vertical direction tilting angle and/or horizontal direction scan angle of a beam) of a beam generated from the codebook C is determined uniformly based on the all numbers (i.e., $Q_v$ and/or $Q_H$) of an angle of a beam in the one-dimension within an upper limit value and a lower limit value. Furthermore, a codebook C may be configured such that an angle (i.e., vertical direction tilting angle and/or horizontal direction scan angle of a beam) of a beam generated from the codebook C is determined uniformly in an interval (spacing) of an angle between beams from an upper limit value and a lower limit value.

Alternatively, when the non-uniform scheme in 1-B) method above is used, a codebook C may be configured such that an angle (i.e., vertical direction tilting angle and/or horizontal direction scan angle of a beam) of a beam generated from the codebook C is determined non-uniformly based on a weight within an upper limit value and a lower limit value.

Alternatively, when the mechanical tilting is used, by transforming a coordinate system for representing a direction of a beam based on a mechanical tilting angle, an angle (i.e., vertical direction tilting angle and/or horizontal direction scan angle of a beam) in the one-dimension of a beam generated from a codebook C may be determined.

Here, the codebook C may be configured by Kronecker product of a vertical codebook $W_V$ for a vertical antenna element and a horizontal codebook $W_H$ for a horizontal antenna element.

More particularly, the codebook C may be configured by Kronecker product of $W_V$ configured by the Equation exemplified in FIG. 15 and $W_H$ configured by the existing DFT matrix. Alternatively, the codebook may be configured by Kronecker product of $W_H$ configured by the Equation exemplified in FIG. 16 and $W_V$ configured by the existing DFT matrix. Alternatively, the codebook may be configured by using Equation 19 above based on the matrixes of $W_V$ configured by the Equation exemplified in FIG. 15 and $W_H$ configured by the Equation exemplified in FIG. 16.

In addition, when a mechanical tilting is used by an eNB, by transforming the coordinate system based on rotational angles ($\alpha$, $\beta$, $\gamma$) (i.e., mechanical tilting angles) in each axis (x, y, z) of the coordinate system that represents a direction of a beam, the vertical direction tilting angle $\theta'$ and/or the horizontal direction scan angle $\varphi'$ of a beam in the codebook C may be determined.

The UE may transmit a Precoding Matrix Indicator (PMI) indicating a precoding matrix selected in the codebook C to the eNB (step, S2003).

In this case, the UE may transmit a PMI indicating a precoding matrix selected in the whole codebook C or a subset of the codebook C to the eNB.

In addition, as described above, in the case that the codebook C is configured in a dual form, the UE may transmit an index indicating one of the subset of the codebook according to a bit number of the PMI to the eNB as a PMI.

General Apparatus to which the Present Invention may be Applied

FIG. 21 illustrates a block diagram of a wireless communication apparatus according to an embodiment of the present invention.

Referring to FIG. 21, the wireless communication system includes a base station (eNB) 2110 and a plurality of user equipments (UEs) 2120 located within the region of the eNB 2110.

The eNB 2110 includes a processor 2111, a memory 2112 and a radio frequency unit 2113. The processor 2111 implements the functions, processes and/or methods proposed in FIGS. 1 to 20 above. The layers of wireless interface protocol may be implemented by the processor 2111. The memory 2112 is connected to the processor 2111, and stores various types of information for driving the processor 2111. The RF unit 2113 is connected to the processor 2111, and transmits and/or receives radio signals.

The UE 2120 includes a processor 2121, a memory 2122 and a radio frequency unit 2123. The processor 2121 implements the functions, processes and/or methods proposed in FIGS. 1 to 20 above. The layers of wireless interface protocol may be implemented by the processor 2121. The memory 2122 is connected to the processor 2121, and stores various types of information for driving the processor 2121. The RF unit 2123 is connected to the processor 2121, and transmits and/or receives radio signals.

The memories 2112 and 2122 may be located interior or exterior of the processors 2111 and 2121, and may be connected to the processors 2111 and 2121 with well known means. In addition, the eNB 2110 and/or the UE 2120 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The codebook configuration method in a multi-antenna wireless communication system of the present invention has been described mainly with the example applied to 3GPP LTE/LTE-A system, but may also be applied to various wireless communication systems except the 3GPP LTE/LTE-A system.

The invention claimed is:

1. A method for configuring a codebook performed by a user equipment (UE) in a wireless communication system, the method comprising:

receiving a parameter for configuring a codebook C from a base station (BS); and configuring the codebook C using the parameter, wherein the codebook C is configured by Kronecker product of a vertical codebook $W_V$ for vertical antenna elements and a horizontal codebook $W_H$ for horizontal antenna elements, wherein the parameter includes an upper limit value and a lower limit value of an angle in one-dimension of a beam generated based on the codebook C, wherein the vertical codebook $W_V$ is configured by Equation below:

[Equation]

$$W_V = \begin{bmatrix} 1 & 1 & \cdots & 1 \\ \exp(j \cdot 2\pi \cdot \frac{d_v}{\lambda} \cdot \cos(\theta_{etilt,1})) & \exp(j \cdot 2\pi \cdot \frac{d_v}{\lambda} \cdot \cos(\theta_{etilt,2})) & \cdots & \exp(j \cdot 2\pi \cdot \frac{d_v}{\lambda} \cdot \cos(\theta_{etilt,Q_V})) \\ \vdots & \vdots & \ddots & \vdots \\ \exp(j \cdot 2\pi \cdot (N_v-1)\frac{d_v}{\lambda} \cdot \cos(\theta_{etilt,1})) & \exp(j \cdot 2\pi \cdot (N_v-1)\frac{d_v}{\lambda} \cdot \cos(\theta_{etilt,2})) & \cdots & \exp(j \cdot 2\pi \cdot (N_v-1)\frac{d_v}{\lambda} \cdot \cos(\theta_{etilt,Q_V})) \end{bmatrix}$$

wherein, $N_V$ is a number of the vertical antenna elements, $d_V$ is an interval between the vertical antenna elements, $Q_V$ is determined to be a product of $N_V$ and an oversampling factor, and $\theta_{etilt}$ is a vertical tilting angle of the beam.

2. The method for configuring a codebook of claim 1, wherein the horizontal codebook $W_H$ is configured by Equation below:

[Equation]

$$w_{H,1} = \begin{bmatrix} 1 & 1 & \cdots & 1 \\ \exp\left(j \cdot 2\pi \cdot \frac{d_H}{\lambda} \cdot \sin(\theta_{etilt1}) \cdot \sin(\varphi_{escan1})\right) & \exp\left(j \cdot 2\pi \cdot \frac{d_H}{\lambda} \cdot \sin(\theta_{etilt1}) \cdot \sin(\varphi_{escan2})\right) & \cdots & \exp\left(j \cdot 2\pi \cdot \frac{d_H}{\lambda} \cdot \sin(\theta_{etilt1}) \cdot \sin(\varphi_{escanQ_n})\right) \\ \vdots & \vdots & \ddots & \vdots \\ \exp\left(j \cdot 2\pi \cdot (N_H - 1) \cdot \frac{d_H}{\lambda} \cdot \sin(\theta_{etilt1}) \cdot \sin(\varphi_{escan1})\right) & \exp\left(j \cdot 2\pi \cdot (N_H - 1) \cdot \frac{d_H}{\lambda} \cdot \sin(\theta_{etilt1}) \cdot \sin(\varphi_{escan2})\right) & \cdots & \exp\left(j \cdot 2\pi \cdot (N_H - 1) \cdot \frac{d_H}{\lambda} \cdot \sin(\theta_{etilt1}) \cdot \sin(\varphi_{escanQ_n})\right) \end{bmatrix}$$

$$w_{H,2} = \begin{bmatrix} 1 & 1 & \cdots & 1 \\ \exp\left(j \cdot 2\pi \cdot \frac{d_H}{\lambda} \cdot \sin(\theta_{etilt2}) \cdot \sin(\varphi_{escan1})\right) & \exp\left(j \cdot 2\pi \cdot \frac{d_H}{\lambda} \cdot \sin(\theta_{etilt2}) \cdot \sin(\varphi_{escan2})\right) & \cdots & \exp\left(j \cdot 2\pi \cdot \frac{d_H}{\lambda} \cdot \sin(\theta_{etilt2}) \cdot \sin(\varphi_{escanQ_n})\right) \\ \vdots & \vdots & \ddots & \vdots \\ \exp\left(j \cdot 2\pi \cdot (N_H - 1) \cdot \frac{d_H}{\lambda} \cdot \sin(\theta_{etilt2}) \cdot \sin(\varphi_{escan1})\right) & \exp\left(j \cdot 2\pi \cdot (N_H - 1) \cdot \frac{d_H}{\lambda} \cdot \sin(\theta_{etilt2}) \cdot \sin(\varphi_{escan2})\right) & \cdots & \exp\left(j \cdot 2\pi \cdot (N_H - 1) \cdot \frac{d_H}{\lambda} \cdot \sin(\theta_{etilt2}) \cdot \sin(\varphi_{escanQ_n})\right) \end{bmatrix}$$

$$w_{H,Q} = \begin{bmatrix} 1 & 1 & \cdots & 1 \\ \exp\left(j \cdot 2\pi \cdot \frac{d_H}{\lambda} \cdot \sin(\theta_{etiltQ_V}) \cdot \sin(\varphi_{escan1})\right) & \exp\left(j \cdot 2\pi \cdot \frac{d_H}{\lambda} \cdot \sin(\theta_{etiltQ_V}) \cdot \sin(\varphi_{escan2})\right) & \cdots & \exp\left(j \cdot 2\pi \cdot \frac{d_H}{\lambda} \cdot \sin(\theta_{etiltQ_V}) \cdot \sin(\varphi_{escanQ_H})\right) \\ \vdots & \vdots & \ddots & \vdots \\ \exp\left(j \cdot 2\pi \cdot (N_H - 1) \cdot \frac{d_H}{\lambda} \cdot \sin(\theta_{etiltQ_V}) \cdot \sin(\varphi_{escan1})\right) & \exp\left(j \cdot 2\pi \cdot (N_H - 1) \cdot \frac{d_H}{\lambda} \cdot \sin(\theta_{etiltQ_V}) \cdot \sin(\varphi_{escan2})\right) & \cdots & \exp\left(j \cdot 2\pi \cdot (N_H - 1) \cdot \frac{d_H}{\lambda} \cdot \sin(\theta_{etiltQ_V}) \cdot \sin(\varphi_{escanQ_H})\right) \end{bmatrix}$$

wherein, $N_H$ is a number of the horizontal antenna elements, $d_H$ is an interval between the horizontal antenna elements, $Q_H$ is determined to be a product of $N_H$ and an oversampling factor, and $\Phi_{escan}$ is a horizontal scan angle of the beam.

3. The method for configuring a codebook of claim 1, wherein the parameter includes all angles in the one dimension of the beam.

4. The method for configuring a codebook of claim 1, wherein the parameter includes the upper limit value and the lower limit value of the angle in the one dimension of the beam, and
wherein the angle is uniformly set based on a total numbers of the angle of the beam in the one-dimension within the upper limit value and the lower limit value, when the angle is uniformly set.

5. The method for configuring a codebook of claim 1, wherein the parameter includes the upper limit value and the lower limit value of the angle in the one dimension of the beam, and an angle between beams, and
wherein the angle in the one dimension of the beam generated from the codebook C is uniformly set with an interval of the angle between beams from the upper limit value and the lower limit value, when the angle in the one dimension of the bean is uniformly set.

6. The method for configuring a codebook of claim 1, wherein the parameter includes the upper limit value and the lower limit value the angle in the one dimension of the beam, and a weight applied to an angle between beams, and
wherein the angle in the one dimension of the beam generated from the codebook C is non-uniformly set based on the weight within the upper limit value and the lower limit value.

7. The method for configuring a codebook of claim 1, further comprising transmitting a Precoding Matrix Indicator (PMI) indicating a precoding matrix selected in the codebook C to the BS.

8. The method for configuring a codebook of claim 1, wherein the vertical codebook $W_V$ is configured by Equation below:

$$D_{(mn)}^{N_V \times N_V a} = \frac{1}{\sqrt{N_V}} e^{j\frac{2\pi(m-1)(n-1)}{N_V a}}, \quad \text{[Equation]}$$

-continued
$$m = 1, 2, \ldots, N_V, n = 1, 2, \ldots, N_V a$$

wherein, $D_{(mn)}^{N_V \times N_V a}$ is a Discrete Fourier Transform (DFT) matrix, and a is the oversampling factor.

9. The method for configuring a codebook of claim 1, wherein the horizontal codebook $W_H$ is configured by Equation below:

$$D_{(mn)}^{N_H \times N_H a} = \frac{1}{\sqrt{N_H}} e^{j\frac{2\pi(m-1)(n-1)}{N_H a}} \quad \text{[Equation]}$$

wherein $D_{(mn)}^{N_H \times N_H a}$ is a Discrete Fourier Transform (DFT) matrix, $N_H$ is a number of the horizontal antenna elements, and a is the oversampling factor.

10. The method for configuring a codebook of claim 1, wherein the parameter includes a mechanical tilting angle, and
wherein the angle in the one-dimension of the beam generated from the codebook C is determined by transforming a coordinate system for representing a direction of the beam based on the mechanical tilting angle.

11. A user equipment (UE) configuring a codebook in a wireless communication system, the UE comprising:
a transceiver configured to transmit and receive a radio signal; and
a processor configured to control the transceiver,
wherein the processor is configured to perform:
receiving a parameter for configuring a codebook C from a base station (BS); and
configuring the codebook C using the parameter,
wherein the codebook C is configured by Kronecker product of a vertical codebook $W_V$ for vertical antenna elements and a horizontal codebook $W_H$ for horizontal antenna elements,
wherein the parameter includes an upper limit value and a lower limit value of an angle in one-dimension of a beam generated based on the codebook C,
wherein the vertical codebook $W_V$ is configured by Equation below:

$$W_V = \begin{bmatrix} 1 & 1 & \cdots & 1 \\ \exp\left(j \cdot 2\pi \cdot \frac{d_v}{\lambda} \cdot \cos(\theta_{etilt,1})\right) & \exp\left(j \cdot 2\pi \cdot \frac{d_v}{\lambda} \cdot \cos(\theta_{etilt,2})\right) & \cdots & \left|\exp\left(j \cdot 2\pi \cdot \frac{d_v}{\lambda} \cdot \cos(\theta_{etilt,Q_V})\right)\right. \\ \vdots & \vdots & \ddots & \vdots \\ \exp\left(j \cdot 2\pi \cdot (N_v - 1)\frac{d_v}{\lambda} \cdot \cos(\theta_{etilt,1})\right) & \exp\left(j \cdot 2\pi \cdot (N_v - 1)\frac{d_v}{\lambda} \cdot \cos(\theta_{etilt,2})\right) & \cdots & \exp\left(j \cdot 2\pi \cdot (N_v - 1)\frac{d_v}{\lambda} \cdot \cos(\theta_{etilt,Q_V})\right) \end{bmatrix} \quad \text{[Equation]}$$

wherein, $N_V$ is a number of the vertical antenna elements, $d_V$ is an interval between the vertical antenna elements, $Q_V$ is determined to be a product of $N_V$ and an oversampling factor, and $\theta_{etilt}$ is a vertical tilting angle of the beam.

* * * * *